United States Patent
Takahashi et al.

(10) Patent No.: US 6,288,744 B1
(45) Date of Patent: *Sep. 11, 2001

(54) SOLID-STATE IMAGE PICKUP DEVICE WITH A SHARED SHIFT REGISTER AND METHOD OF DRIVING THE SAME

(75) Inventors: Hideki Takahashi, Gifu; Tohru Watanabe, Ogaki, both of (JP)

(73) Assignee: Sanyo Electric Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/555,118

(22) Filed: Nov. 8, 1995

(30) Foreign Application Priority Data

Nov. 11, 1994 (JP) .................................................. 6-277693
Nov. 11, 1994 (JP) .................................................. 6-277694
Nov. 30, 1994 (JP) .................................................. 6-296892

(51) Int. Cl.$^7$ ...................................................... H04N 3/14
(52) U.S. Cl. ........................ 348/311; 348/317; 348/319; 348/322
(58) Field of Search .................................. 348/311, 315, 348/316, 317, 318, 319, 324, 322; 257/242, 217, 220, 232, 240, 249

(56) References Cited

U.S. PATENT DOCUMENTS 4,242,700 * 12/1980 Weimer ................................. 348/275
4,455,575 * 6/1984 Murakoshi .......................... 348/322
4,539,596 * 9/1985 Elabd .................................. 348/316

(List continued on next page.)

FOREIGN PATENT DOCUMENTS 57-181275 11/1982 (JP) .
4084575 3/1992 (JP) .

OTHER PUBLICATIONS

European Search Report, dated Feb. 21, 1996, Appl. No. EP 95 30 7972.

Sohei Manabe, et al., "TP 11.5: A charge summation 1/2–inch CCD image sensor with 35dB Dynamic Range", IEEE International Solid–State Circuits conference, Feb. 1992.

Masayuki Uchiyama, et al., "A Digital Still Camera", IEEE Transactions on Consumer Electronics, 38 (1992) Aug., No. 3.

*Primary Examiner*—Wendy Garber
*Assistant Examiner*—Aung S. Moe
(74) *Attorney, Agent, or Firm*—Hogan & Hartson, L.L.P.

(57) ABSTRACT

The invention is intended to provide a highly integrated solid-state image pickup device, in which the number of transfer electrodes of a horizontal shift register is reduced, and a plurality of vertical shifter registers are arranged with a reduced pitch therebetween. Output-control gate electrodes are disposed at an output end of the vertical shift registers. These output-control gate electrodes are operated independently from vertical transfer gate electrodes, and temporarily reserve information charges. Horizontal transfer gate electrodes corresponding to the vertical shift registers on odd-numbered columns are turned on, so signals charges in these vertical shift registers are read into a horizontal shift register. During horizontal transfer of these information charges, information charges of vertical shift registers on even-numbered columns are reserved, for half of a horizontal scanning period, in output ends of the vertical shift registers by the output-control gate electrodes. Thereafter, the information charges in the vertical shift registers on the even-numbered columns are read into the horizontal shift register, and are horizontally transferred. Since one horizontal transfer operation requires half of the pixels per row, the horizontal shift regiter includes two transfer electrodes for each vertical shift register.

18 Claims, 15 Drawing Sheets

U.S. PATENT DOCUMENTS

| | | | | |
|---|---|---|---|---|
| 4,669,100 | * | 5/1987 | Slotboom et al. | 257/236 |
| 4,805,026 | * | 2/1989 | Oda | 348/320 |
| 4,807,037 | * | 2/1989 | Iesaka et al. | 348/323 |
| 4,839,734 | * | 6/1989 | Takemura et al. | 348/319 |
| 4,998,153 | * | 3/1991 | Kuyk et al. | 257/241 |
| 5,018,172 | * | 5/1991 | Steenhof | 257/218 |
| 5,051,832 | * | 9/1991 | Losee et al. | 348/317 |
| 5,278,660 | * | 1/1994 | Sugiki | 348/305 |
| 5,321,509 | * | 6/1994 | Kannegundla | 348/322 |
| 5,400,071 | * | 3/1995 | Yamada | 348/316 |
| 5,446,493 | * | 8/1995 | Endo et al. | 348/320 |
| 5,591,660 | * | 1/1997 | Fujikawa et al. | 348/311 |
| 5,619,225 | * | 4/1997 | Hashimoto | 345/98 |

* cited by examiner

SOLID-STATE IMAGE PICKUP DEVICE WITH A SHARED SHIFT REGISTER AND METHOD OF DRIVING THE SAME

BACKGROUND OF THE INVENTION

1. Field of the Invention

This invention relates to a two-dimensional solid-state image pickup device in which a plurality of pixels are arranged in the shape of a matrix, and a method of driving such a solid-state image pickup device.

2. Description of the Related Art

A solid-state image pickup device, a so-called area sensor, is used for an imaging apparatus such as a video camera, and includes a plurality of pixels arranged in the shape of a matrix. The solid-state image pickup device reads out information charges indicative of information, produced by respective pixels through photoelectric conversion, in a predetermined order via a plurality of shift registers.

Referring to FIG. 1 of the accompanying drawings, a frame transfer type CCD solid-state image pickup device comprises a plurality of juxtaposed vertical shift registers 1 and a horizontal shift register 2. Each of the vertical shift registers 1 includes an image pick-up section and a storage section which are aligned. The horizontal shift register 2 is located at output sides of the respective vertical shift registers 1.

Each image pick-up section includes a plurality of pixels formed by electrically dividing each shift register 1. In response to a frame transfer clock pulse FS, information charges produced by the pixels are transferred from the image pick-up section to the storage section, where the information charges are temporarily stored. Then, in response to a vertical transfer clock pulse VS, the stored information charges are transferred line by line to each bit of the horizontal shift register 2. In accordance with a horizontal transfer clock pulse HS, each line of the information charges is transferred from the horizontal shift register 2 to an output unit 3. The output unit 3 converts an amount of the information charges into a voltage value, which is transmitted as a picture signal.

An interline type CCD solid-state image pickup device, shown in FIG. 2, comprises a plurality of pixels 4 arranged in an array, a plurality of vertical shift registers 5 interposed between columns of the pixels 4, and a horizontal shift register 6 located at output sides of the vertical shift registers 5.

Information charges present at the pixels are transferred to the vertical shift register 5, from which they are transferred, line by line, to the horizontal shift register 6 in response to a vertical transfer clock pulse VS. As with the frame transfer type CCD solid-state image pickup device, the information charges are transferred line by line from the horizontal shift register 6 to an output unit 7. Then, the output unit 3 transmits the information charges as a picture signal.

FIG. 3 shows a manner in which the vertical and horizontal shift registers are interconnected in the CCD solid-state image pickup device of the prior art.

The solid-state image pickup device comprises a plurality of vertical shift registers 10. Each vertical shift register 10 includes a channel region 11 and a plurality of transfer gate electrodes 12, 13 which are arranged in an overlapping manner. The channel regions 11 and the transfer gate electrodes 12, 13 are formed on a semiconductor substrate. The transfer gate electrodes 12, 13 are commonly used for the shift registers 10. The channel regions 11 are separated by channel-stop regions 14 made of insulators such as thick oxide layers which are selectively oxidized, and are electrically independent from one another. Each channel region 11 is a buried channel in which an N-type region is implanted on a P-type region. The transfer gate electrodes 12 are disposed on and across the channel region 11 and the channel-stop region 14, and are equally spaced therebetween. The transfer gate electrodes 13 are disposed on the channel region 11 between the transfer gate electrodes 12 in such a manner as to overlap with the transfer gate electrodes 12. Four-phase vertical transfer clock pulses VS1 to VS4 are applied to the transfer gate electrodes 12, 13. Thus, information charges are vertically and sequentially transferred from the channel regions 11 in response to the vertical transfer clock pulses VS1 to VS4.

A horizontal shift register 20 includes a channel region 21 and a plurality of transfer gate electrodes 22 and 23. The channel region 21 is defined by an insular channel-stop region 24 extending from the channel-stop region 14 of the vertical shift registers 10 and a channel-stop region 25 positioned opposite to the insular channel-stop region 24. The channel region 21 is connected to ends of the channel regions 11 of the vertical shift registers 10 via spaces between the insular channel separators 24. The channel region 21 is a buried channel similar to the channel region 11. The gate transfer electrodes 22 span across the channel-stop regions 24, 25. Further, every two transfer gates 22 extend to the shift registers 11, cover connecting portions between the channel regions 11 of the vertical shift registers 10 and the channel regions 21, and overlap with the transfer gate electrodes 13 at the output ends of the vertical shift registers 10. The transfer gate electrodes 23 are disposed above the channel region 21 such that they cover the spaces between the transfer gate electrodes 22. The transfer gate electrodes 22, 23 overlap with one another. Every two adjacent transfer gate electrodes 22, 23 are interconnected.

Two-phase horizontal clock pulses HS1, HS2 are applied to each connected pair of transfer gate electrodes 22, 23. In response to the horizontal clock pulses HS1, HS2, the information charges in the channel regions 21 are horizontally transferred. The horizontal transfer clock pulses HS1, HS2 are set such that one line of the information charges is transferred while the information charges in the vertical shift register 10 are transferred to each next bit in response to the vertical transfer clock pulses VS1 to VS4. Therefore, the information charges transferred to the horizontal shift register 20 from the vertical shift register 10 are transmitted outside the horizontal shift register 20 before the vertical shift register 10 transfer succeeding information charges to the horizontal shift register 20.

In the foregoing CCD solid-state image pickup device, a total of four electrodes, i.e. two transfer gate electrodes 22 and two transfer gate electrodes 23, should be arranged in each vertical shift register. Therefore, it is impossible to make a pitch of each vertical shift register 10 smaller than a minimum space for housing the transfer gate electrodes 22, 23. It is therefore necessary to enlarge the CCD solid-state Image pickup device so as to improve resolution of the Image pickup device by increasing the number of pixels. This measure inevitably makes the image pickup device expensive.

SUMMARY OF THE INVENTION

It is an object of the present invention to simplify the structure of the connecting parts between the vertical shift registers and the horizontal shift register, and to enhance integration of elements by reducing the pitch of the vertical shift registers.

According a first aspect of the invention, there is provided a solid-state image pickup device comprising: a plurality of vertical shift registers for vertically transferring the information charges generated by a plurality of pixels, the vertical shift registers corresponding to respective columns of the pixels; a horizontal shift register for receiving the information charges from an end of the plurality of vertical shift registers and horizontally transferring the information charges; and an output unit for converting the information charges from one end of the horizontal shift register into a voltage value and generating a picture signal. The vertical shift registers includes a group of vertical transfer electrodes for vertically transferring the information charges in each column and at least two output-control electrodes disposed at an output end thereof. The output-control electrodes temporarily suspend transfer of the information charges to the horizontal shift register independently of vertical transfer of the information charges by the vertical transfer electrodes. Channels connecting the plurality of vertical shift registers and the horizontal shift registers are a semiconductor region whose potential deepens toward the horizontal shift register.

The foregoing solid-state image pickup device is driven by a method comprising the steps of: a first step of turning off the even-numbered bits and turning on the odd-numbered bits so as to transfer information charges from the odd-numbered columns of the vertical shift registers to the odd-numbered bits of the horizontal shift register; a second step of turning off one of the output-control gate electrodes and horizontally transferring the information charges in the odd-numbered bits of the horizontal shift register; a third step of turning off the odd-numbered bits and turning on the even-numbered bits so as to transfer the information charges from the even-numbered columns of the vertical shift registers to the even-numbered bits of the horizontal shift register; and a fourth step of turning off one of the output-control electrodes and horizontally transferring the information charges in the even-numbered bits of the horizontal shift register.

In the foregoing aspect of the invention, each vertical shift register includes two output-control gate electrodes at output ends thereof. The vertical shift registers and the horizontal shift register have different potentials. When the horizontal shift register has a potential lower than that of the vertical shift registers, the information charges are transferred to the horizontal shift register. Conversely, when the potential is lower in the horizontal shift register, the information charges are temporarily reserved under the output-control electrodes. Therefore, it is possible to transfer the information charges to the horizontal shift register alternately from each odd-numbered and even-numbered vertical shift registers.

The foregoing image pickup device is driven by the method, in which each of bits at the output ends of the vertical shift registers is independently driven. Thus, the bits of the odd-numbered and even-numbered columns of the horizontal shift register are alternately turned on and off, so the information charges in the vertical shift registers on the odd-numbered and even-numbered columns can be alternately outputted. This can halve the number of packets for simultaneously transferring the information charges to the horizontal shift register, and reduce the number of bits of the horizontal shift register to a half.

According to a second aspect of the invention, there is provided a solid-state image pickup device comprising: a plurality of vertical shift registers for vertically transferring the information charges generated by a plurality of pixels, the vertical shift registers being responsive to respective columns of the pixels; a horizontal shift register for receiving the information charges from an end of the plurality of vertical shift registers and horizontally transferring the information charges; and an output unit for converting the information charges from one end of the horizontal shift register into a voltage value and generating a picture signal. In the foregoing image pickup device, the plurality of vertical shift registers include a group of vertical transfer electrodes for vertically transferring the information charges in each column and at least a pair of output-control electrodes disposed at an output end thereof. The output-control electrodes span over the columns of the plurality of vertical shift registers, and are alternately arranged in a reverse manner in a direction of the vertical transfer in the even-numbered and odd-numbered columns of the vertical shift registers, and make positions for temporarily reserving the information charges different for the odd-number and even-numbered columns of the vertical shift registers such that the information charges are alternately transferred from the odd-numbered and even-numbered columns of the vertical shift registers to the horizontal shift register.

The solid-state Image pickup device is driven by a method comprising: the steps of: alternately operating a pair of output-control electrodes so as to displace positions for reserving the information charges by one bit in the vertical shift registers on the odd-numbered and even-numbered columns; receiving the information charges from the vertical shift registers on the odd-numbered columns at odd-numbered bits of the horizontal shift register and outputting the received information charges during a first period of time; and receiving the information charges from the vertical shift registers on the even-numbered columns at even-numbered bits of the horizontal shift register in a succeeding second period In the invention, two output-control gate electrodes are disposed at the output end of the vertical shift registers. Arrangement of these electrodes is reversed in the vertical shift register on the odd-numbered and even numbered columns. Thus, information charges in the vertical shift registers are reserved under the output-control gate electrodes at positions which are displaced in accordance with a width of each output-control gate electrode. The information charges from a plurality of the vertical shift registers can be divided into those of the vertical shift registers on the odd-numbered columns and those of the vertical shift register on even-numbered columns, and are separately transferred.

With the foregoing driving method of the invention, the information charges are reserved at positions, at output ends of vertical shift registers, which are mutually displaced by one bit. Thus, the information charges can be alternately outputted from vertical shift registers on the odd-numbered columns and on the even-numbered columns. Therefore, it is possible to halve the number of packets of the Information charges which are simultaneously transferred to the horizontal shift register. The number of bits of the horizontal shift registers can be reduced to a half.

In a third aspect of the invention, a the solid-state image pickup device comprising: a plurality of vertical shift registers for vertically transferring the information charges generated by a plurality of pixels, the vertical shift registers corresponding to respective columns of the pixels; a horizontal shift register for receiving the information charges from an end of the plurality of vertical shift register and horizontally transferring the information charges; and an output unit for converting the information charges from one end of the horizontal shift register into a voltage value and generating a picture signal. The vertical shift registers have a plurality of output-control electrodes whose numbers are different on the odd-numbered columns and on the even-numbered columns, and the output-control electrodes vary the times to transfer the information charges to the horizontal shift register depending upon the odd-numbered and even-numbered columns.

The solid-state image is driven by a method comprising the steps of: transferring the information charges in a plurality of vertical shift registers on the odd-numbered and even-numbered columns to the output-control electrode row by row; and controlling a plurality of output-control electrodes such that the information charges of the vertical shift registers on even-numbered columns are stored at output sides thereof while the information charges are being transferred from the vertical shift registers on odd-numbered columns via the horizontal shift register.

With the foregoing solid-state image pickup device, the information charges can be alternately transferred to the horizontal shift register from the vertical shift registers on the even-numbered columns and the vertical shift registers on the odd-numbered columns.

In the solid-state image pickup device, the vertical shift registers on the odd-numbered columns and those on the even-numbered columns have different number of the output-control electrodes at their output ends. For instance, when the vertical shift registers on the odd-numbered columns have fewer output-control electrodes than the vertical shift registers on the even-numbered columns, it is possible to transfer information charges from the vertical shift registers on the odd-numbered columns to the vertical shift registers on the even-numbered columns while information charges of the vertical shift registers on the even-numbered columns are reserved at the output ends thereof. Therefore, the information charges from the odd-numbered pixels and those from the even-numbered pixels can be separately treated when they are transferred from the vertical shift registers to the horizontal shift register.

While the information charges are transferred from the vertical shift registers on the odd-numbered columns via the horizontal shift register, the information charges of the vertical shift registers on the even-numbered columns are reserved at the output ends thereof. Thus, the information charges are alternately outputted to the horizontal shift register from the vertical shift registers on the even-numbered columns and those on the even-numbered columns. This can halve the number of packets for simultaneously transferring the Information charges to the horizontal shift register, and reduce the number of bits of the horizontal shift register to a half.

The invention and its various advantages will be better understood from the following more detailed description taken in conjunction with the accompanying drawings and claims.

DETAILED DESCRIPTION OF THE PREFERRED EMBODIMENTS

Figure 1:
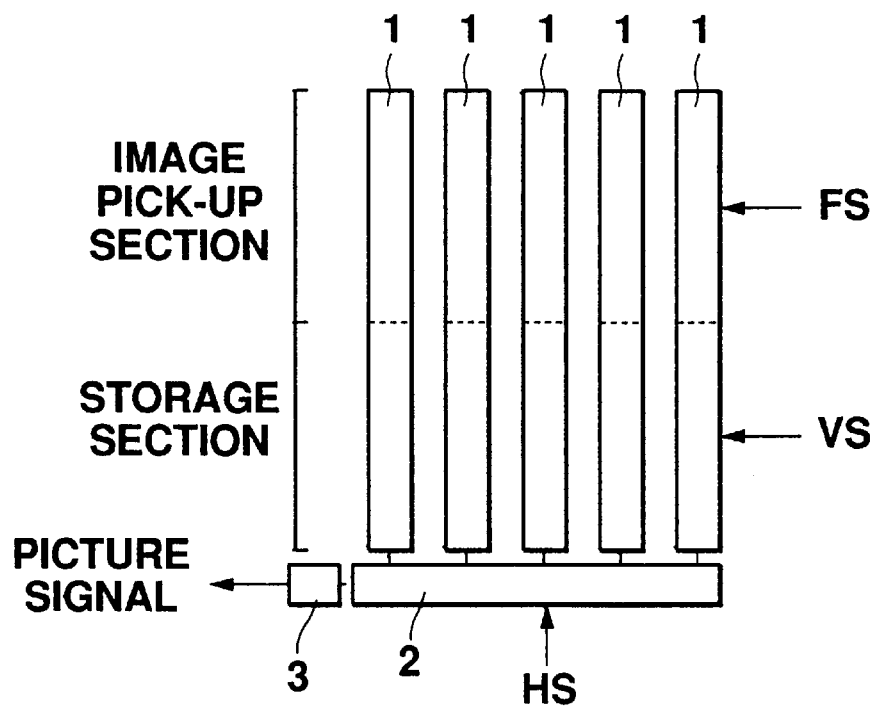
FIG. 1 is a schematic view showing the configuration of a frame transfer type solid-state image pickup device of the prior art.
Figure 2:
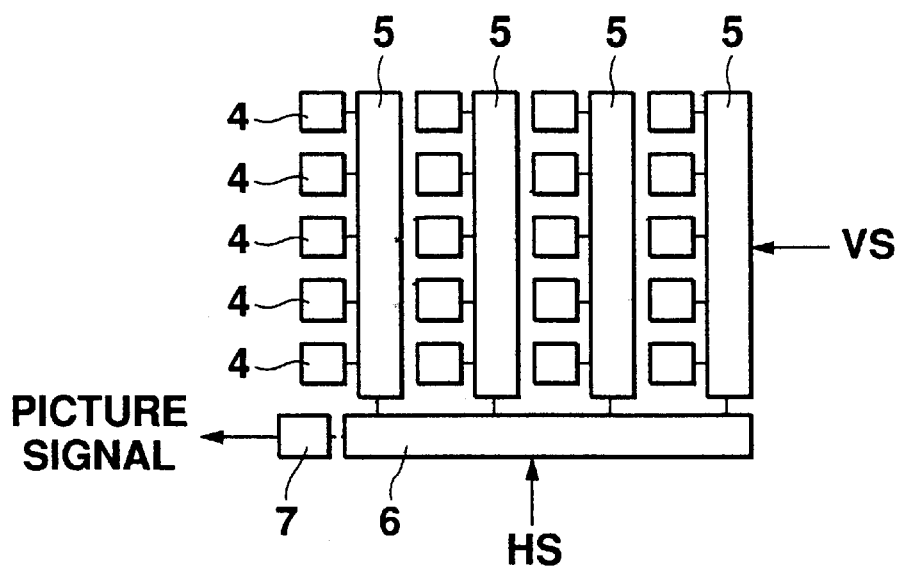
FIG. 2 is a schematic view showing the configuration of an interline type solid-state image pickup device of the prior art.
Figure 3:
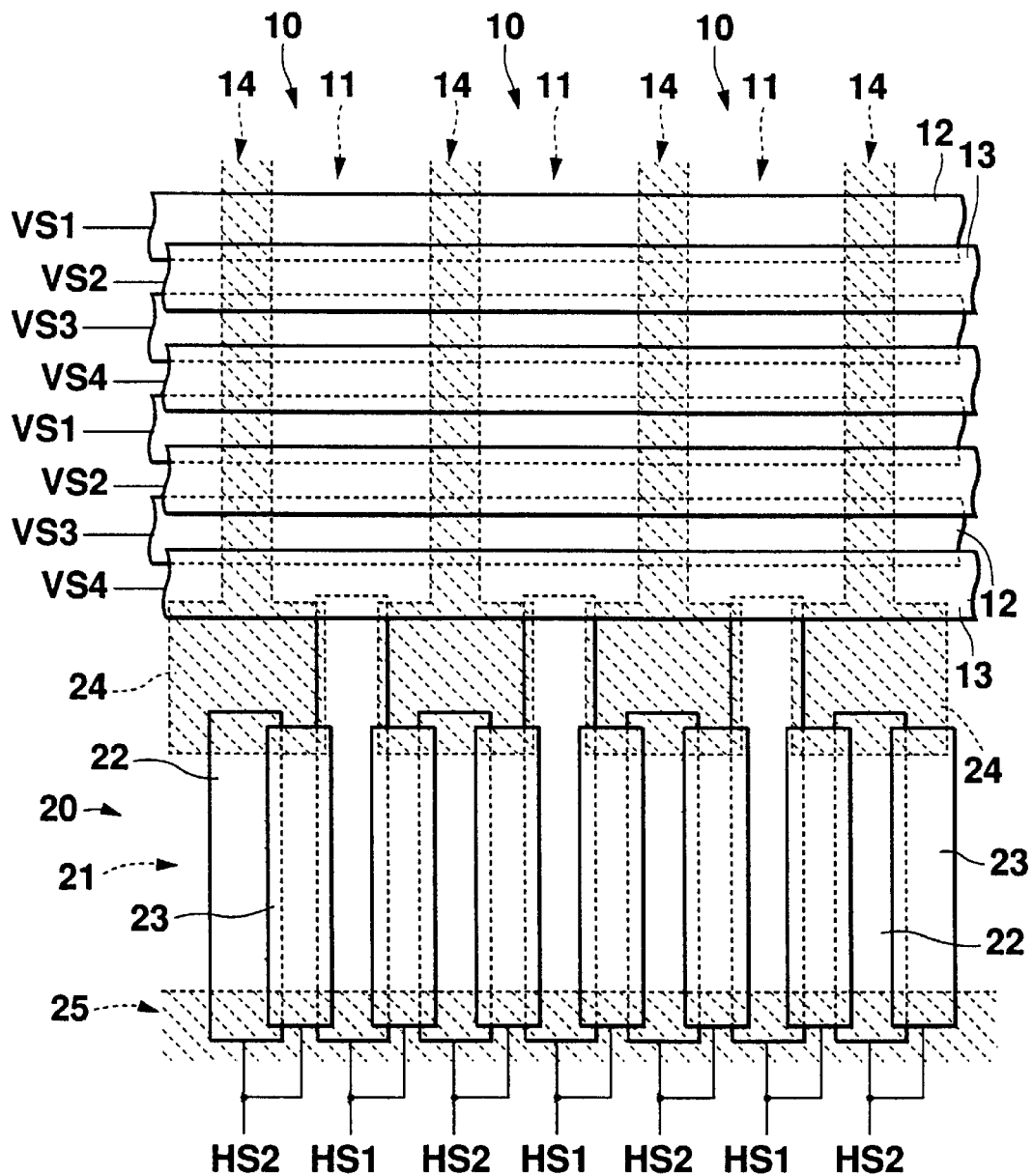
FIG. 3 is a plan view showing the configuration of a part for connecting vertical shift registers and a horizontal shift register in the prior art.
Figure 4:
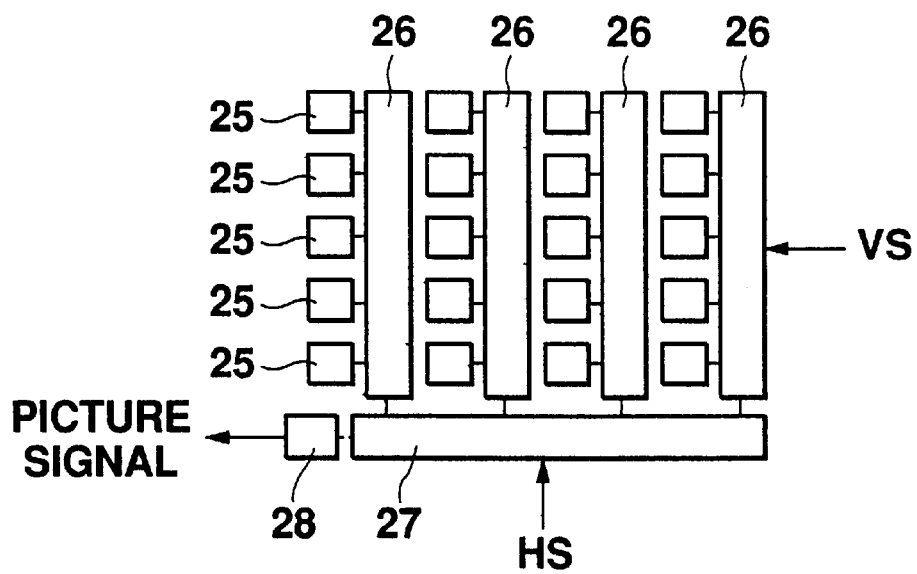
FIG. 4 is a schematic view showing the general configuration of a solid-state image pickup device according to the invention.

Referring to FIG. 4, a solid-state image pickup device of the invention is generally of an interline type. The solid-state image pickup device is formed on a semiconductor substrate, and comprises a plurality of pixels 25, a plurality of CCD (charge coupled device) vertical shift registers 26, a CCD horizontal shift register 27, and an output unit 28. The pixels 25 generate charges by photoelectric conversion, and are arranged in a two-dimensional array. The CCD vertical shift registers 26 vertically transfer the charges from each column of the pixels 25. The horizontal shift register 27 receives the charges from the vertical shift registers 26, and horizontally transfer the charges to the output unit 28. The output unit 28 converts the charges into voltage signals.

The invention features a connection between the vertical shift registers 26 and the horizontal shift register 27, and a method of operating these shift registers. The following describe the main part of the invention, and the general matters of the solid-state image pickup device will be not repeated here since they are identical to those mentioned with respect to the prior art.

Figure 5:
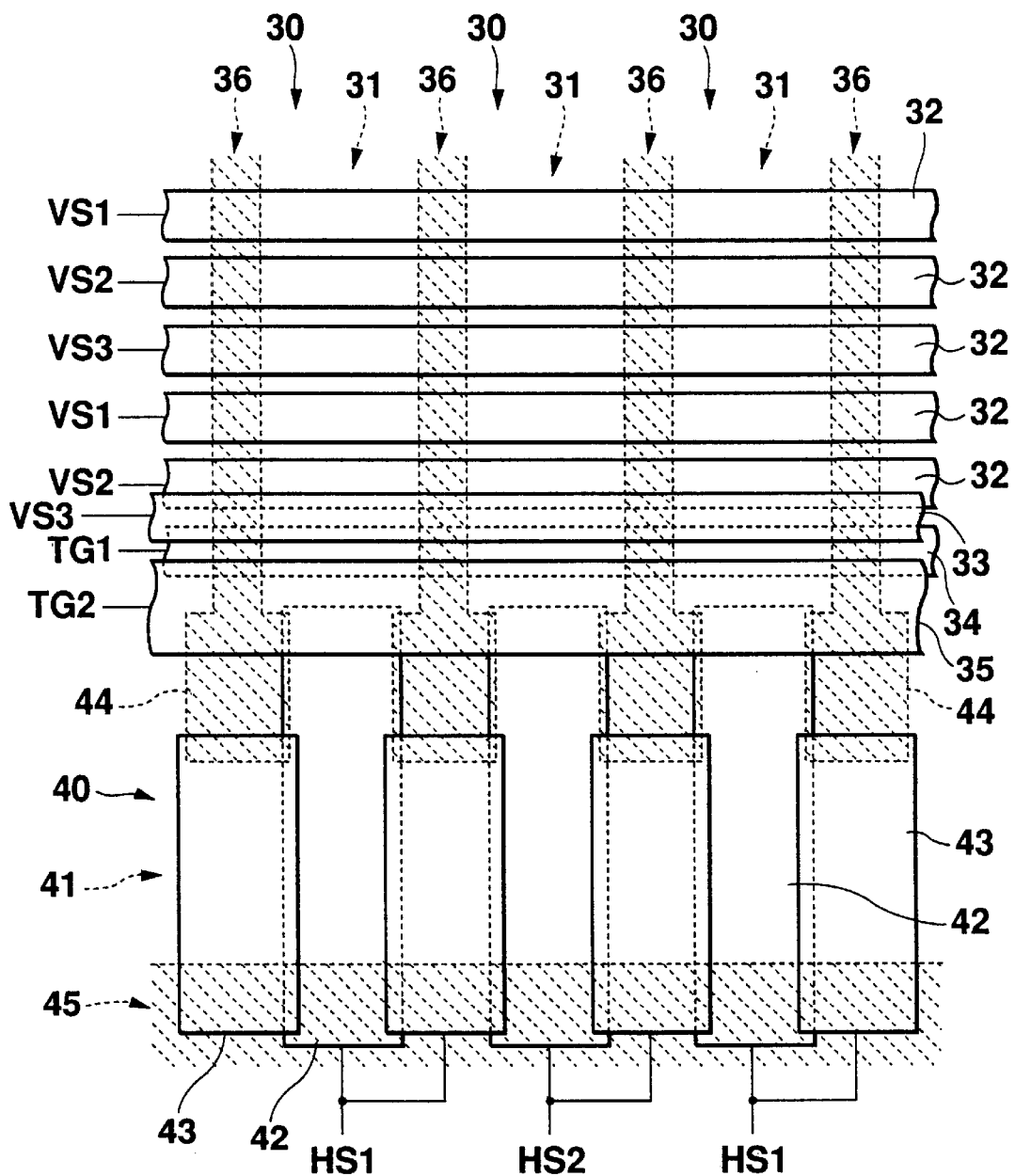
FIG. 5 is a plan view showing the configuration of a part for connecting vertical shift registers and a horizontal shift register in a solid-state image pickup device according to a first embodiment of the invention.

In the first embodiment, a solid-state Image pickup device comprises a plurality of vertical shift registers 30 and a horizontal shift register 40 which are connected as shown in FIG. 5. The connecting structure is applicable to both frame transfer type and frame inter-line type solid-state image pickup devices.

Each vertical shift register 30 includes a channel region 31, a plurality of transfer gate electrodes 32, 33, and first and second output control gate electrodes 34, 35, all of which are formed on a semiconductor substrate. In this solid-state image pickup device, the channel regions 31 are defined by channel-stop regions 36 juxtaposed in parallel with one another, and are electrically independent. Each channel region 31 is a buried channel in which an N-type region is implanted on a P-type region. The transfer gate electrodes 32 are arranged on the channel regions 31 such that they are in parallel with one another and intersect the channel separators 36. In this embodiment, the transfer gate electrodes 32 are arranged in a single layer. Alternatively, they may be arranged in two layers. The first output-control gate electrode 34 is in parallel with the transfer gate electrodes 32, at output sides of the vertical shift registers 30. The transfer gate electrode 33 is arranged across the output-control gate electrode 34 and the transfer gate electrode 32 in an overlapping manner. The second output-control gate electrode 35 overlaps with the first output-control gate electrode 34, and is positioned on output ends of the channel regions 31. The transfer gate electrodes 32, 33 and the output-control gate electrodes 34, 35 serve for all the vertical shift registers 30.

Three-phase vertical transfer clock pulses VS1–VS3 are respectively applied to the transfer gates 32, 33. At the same time, output-control clock pulses TG1 and TG2 are respectively applied to the output-control gate electrodes 34, 35. Thus, information charges in vertical shift registers 30 are sequentially and vertically transferred in response to the vertical transfer clock pulses VS1–VS3. The information charges are temporarily stored at output sides of the channel regions 31 in response to the output-control clock pulses TG1 and TG2.

The horizontal shift register 40 includes a plurality of transfer gate electrodes 42, 43 which are arranged in an overlapping manner. Channel regions 41 are defined by insular channel-stop regions 44, which are integral with the channel-stop regions 36, and a channel-stop region 45 facing against the insular channel-stop regions 44. The channel regions 41 are in connection with ends of the channel regions 31 of the shift registers 30 via spaces between the channel-stop regions 44. The channel regions 41 are buried channels whose structure is similar to the channel regions 31. Each transfer gate electrode 42 spans the channel-stop regions 44, 45, and extends to each vertical shift register 30 so as to cover the part where the channel regions 31 and 41 are connected. The transfer gate electrodes 43 are positioned on the channel regions 41 such that they are present over spaces between the transfer gate electrodes 42 and overlap with the transfer gate electrodes 42. The transfer gate electrodes 42, 43 overlap with one another, and pairs of adjacent transfer gate electrodes 42, 43 are connected with each other. Each two-phase horizontal transfer clock pulse HS1 is applied to each odd-numbered pair of connected transfer gate electrodes 42 and 43, while a two-phase horizontal transfer clock pulse is applied to alternate pairs of connected transfer gate electrodes 42 and 43. Thus, the information charges are horizontally transferred from the channel regions 41.

Between the vertical shift registers 30 and the horizontal shift register 40, when the output-control gate electrodes 34, 35 are turned on and the transfer gate 42 is turned on, a potential well in the horizontal shift register 40 is set to be deeper than a potential well of the vertical shift registers 30. For instance, the potential well in the channel region 41 can be made deeper by adding more N-type impurities than those of the channel regions 31. Thus, the information charges can be efficiently transferred to the channel region 41 of the horizontal shift register 40 from the channel region 31 of the vertical shift registers 30.

Figure 6:
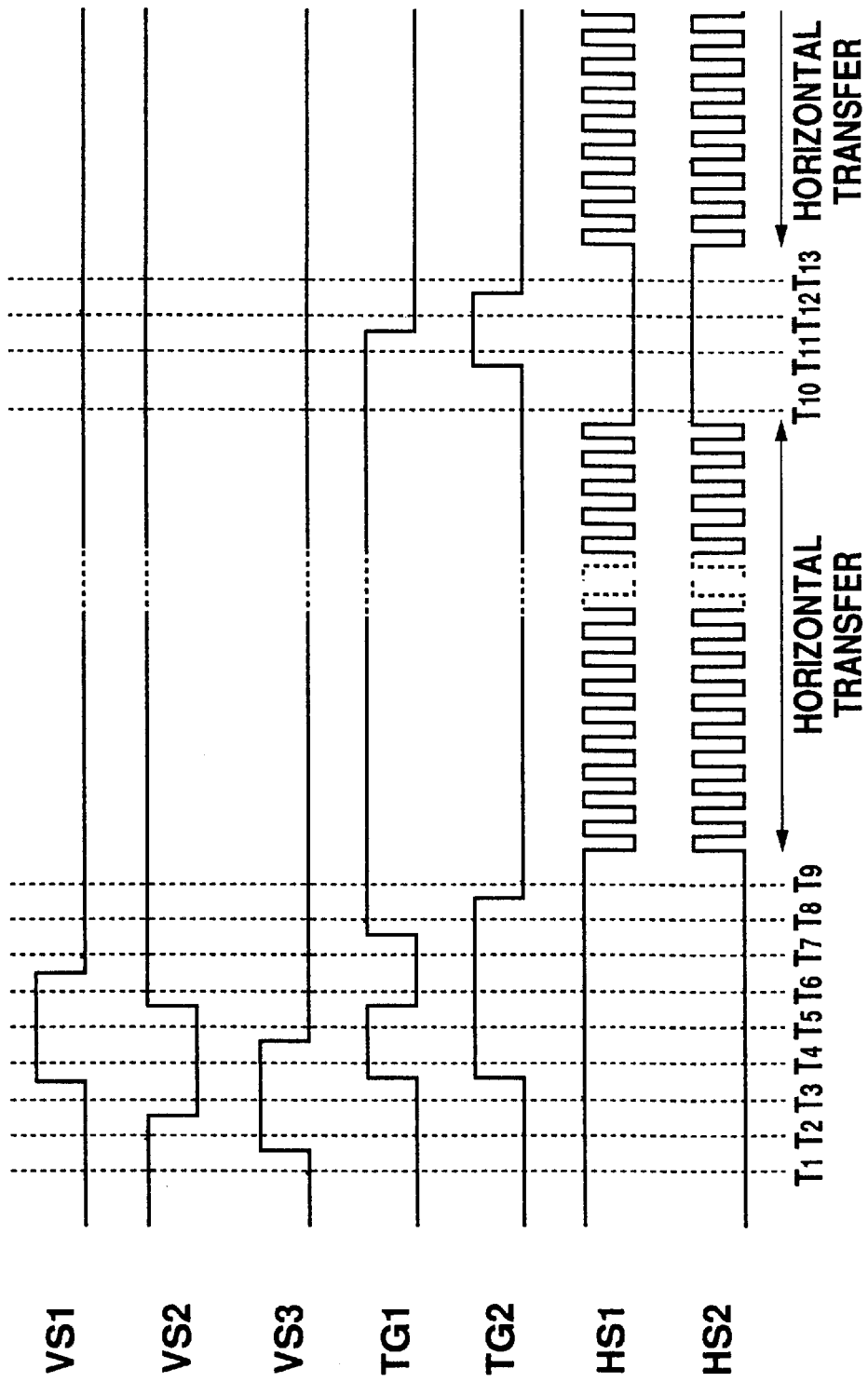
FIG. 6 is a timing chart of clock pulses for operating the solid-state image pickup device of the first embodiment.
Figure 7:
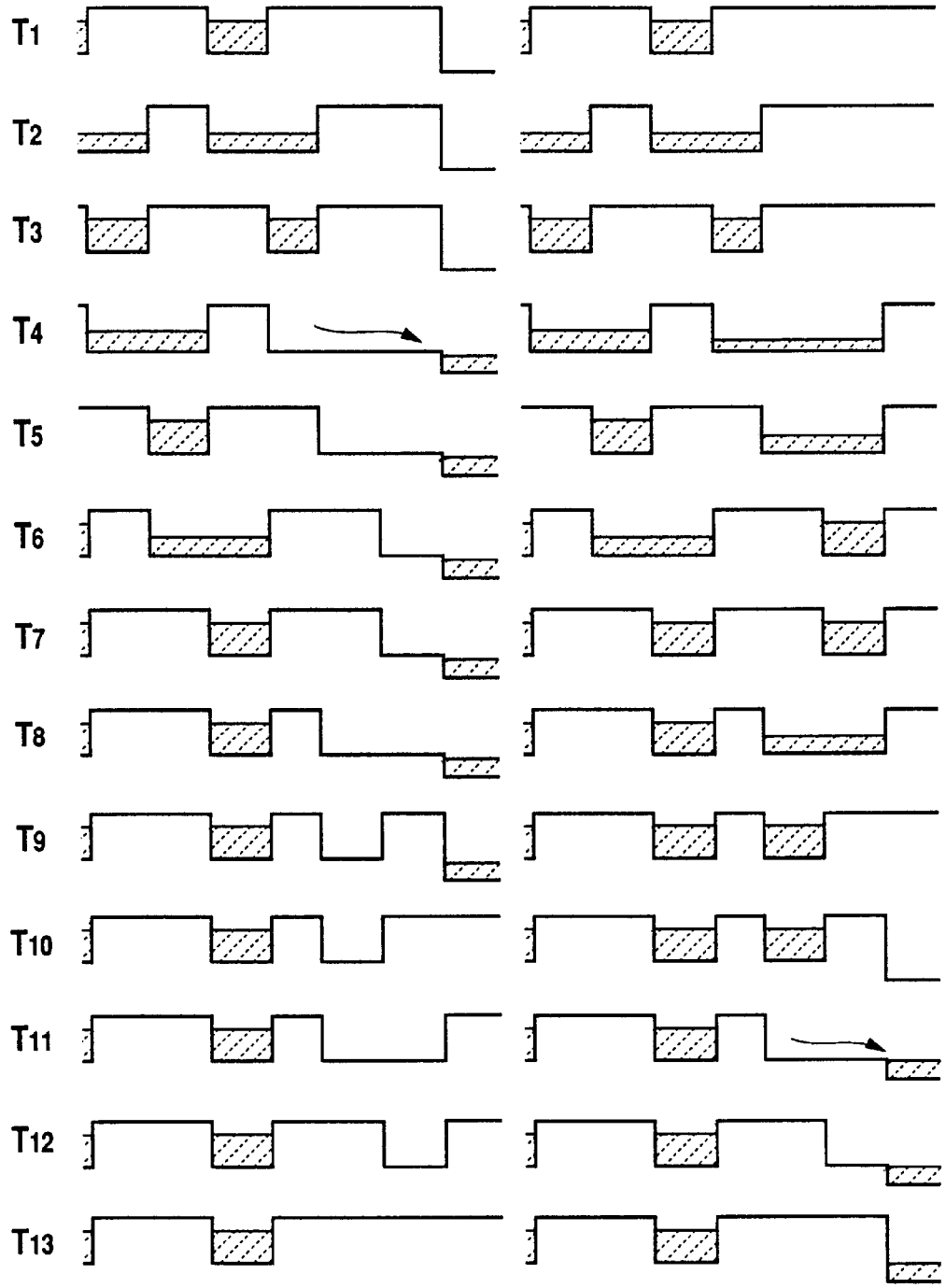
FIG. 7 is a diagram showing potentials for describing a method of operating the solid-state image pickup device of the first embodiment, particularly showing comparison of time-dependent variations of potentials in the vertical shift registers on odd-numbered and even-numbered columns.

The horizontal clock pulses VS1–VS3, output-control clock pulses TG1 and TG2, and horizontal clock pulses HS1 and HS2 are timed as shown in FIG. 6. FIG. 7 shows states of potentials in the channel regions 31 and 41 at the times T1 to T13. It is assumed that the respective gate electrodes are turned on when the clock pulses have a high level H, and are turned off when the clock pulses have a low level L.

First of all, the clock pulse HS1 is set to the level H, and the clock pulse HS2 is set to the level L. At time T1 when the clock pulse VS3 has the level L, the transfer gate electrode 32 corresponding to the clock pulse VS2 is turned on. In this state, a potential well is formed in the channel region 31 under the transfer gate electrode 32 responsive to the clock pulse VS2. The information charges are stored in this potential well. Since the output clock pulses TG1 and TG2 have the level L, the output-control gate electrodes 34, 35 remain in an off-state.

When the clock pulse VS3 has the level H at the time T2, the transfer gate electrodes 32, 33 are turned on In response to VS3, so a potential well Is formed In the channel regions under these electrodes 32, 33. Thereafter, when the clock pulse VS2 has the level L at the time T3, the transfer gate electrode 32 is turned off in response to VS2, and the potential well in the channel region under the transfer gate electrode 32 gate disappears. Thus, the information charges are transferred from the channel region under the transfer gate electrode 32 (responsive to the clock pulse VS2) to the channel region 31 under the transfer gate electrodes 32, 33 (responsive to the vertical clock pulse VS3). It can be seen from FIG. 7 that the information charges are transferred in the similar manner at the time T1 to T3 for the vertical shift registers 30 on the odd- and even-numbered columns.

When the clock pulses TG1 and TG2 have the level H at the time T4, the output-control gate electrodes 34, 35 are turned on, so a potential well will be formed under these electrodes. In the odd-numbered columns of the vertical shift registers 30, the clock pulse HS1 has the level H, and the transfer gate electrode 42 is turned on in the vertical shift register 30. Therefore, the information charges are transferred from the channel region 41 under the transfer gate electrode 33 to the channel region 31 under the transfer gate electrode 42. In the even-numbered columns of the vertical shift registers 30, the clock pulse HS1 has the level L, and the transfer gate electrode 42 is off. Therefore, the information charges are transferred from the channel region 31 under the transfer gate electrode 33 to the channel region 31 under the output-control gate electrodes 34, 35, and reserved therein.

At the time T4, the clock pulse VS1 has the level H. Then, the transfer gate electrodes 32, on the respective columns of the vertical shift registers 30, are turned on in response to the clock pulse VS3, and a potential well is formed.

When the clock pulse VS3 has the level L at the time T5, the transfer gates 32, 33 responsive to the clock pulse VS3 are turned off, so the potential well is made to disappear. Thus, the information charges are transferred to the channel region 31 under the transfer gate electrode 32 (responsive to the clock pulse VS1) from the channel region 31 under the transfer gate electrodes 32, 33 (in response to the clock pulse VS3).

At the time T6, the clock pulse TG1 has the level L, and the output-control gate electrode 34 is turned off, thereby making the potential well disappear. The information charges reserved in the channel region 31 under the output-control electrode 34, of the vertical shift register 30 on the even-numbered column, are transferred to the channel region 31 under the output-control gate electrode 35.

In the vertical shift registers 30 on the odd-numbered columns, the information charges have been transferred, at the time T5, to the channel region 41. Therefore, no information charges will be transferred in this state.

The clock pulse VS2 has the level H at the time T6. The transfer gate electrodes 32 (responsive to the gate pulse VS2) of the vertical shift registers 30 are turned on, so a potential well is formed.

At the time T7, when VS1 has the L level, the transfer gate electrodes 32 responsive to the clock pulse VS1 are turned off. The potential well disappears. Thus, the Information charges are transferred from the channel region 31 under the transfer gate electrode 32 (responsive to the clock pulse VS1) to the channel region 31 under the transfer gate electrode 32 (responsive to the clock pulse VS2). The transferred information charges are stored as they are until further information charges are transferred from the channel region 31 under the output-control gate electrode 35 of the vertical shift registers 30 on the even-numbered columns.

When the clock pulse TG1 resumes the level H at the time T8, the output-control gate 34 is turned on, thereby forming a potential well.

At the time T9, when TG2 has the level L, the output-control gate 34 is turned off, so the potential well disappears. Thereafter, the information charges are returned to the channel region 31 under the output-control gate 34 from the channel region under the output-control gate electrode 35. The clock pulses HS1 and HS2 which have been held until now are repeatedly reversed while the vertical shift registers 30 are maintained in the state at the time T9. Thus, the information charges are horizontally transferred from the channel region 31 under the transfer gate electrodes 42 corresponding to the vertical shift registers 30 on the odd-numbered columns.

Cycles of the clock pulses HS1, HS2 are determined such that the information charges for a half line in the horizontal shift register 40 can be transferred within a predetermined period of time. Thus, all the information charges are externally transmitted from the channel region 41 of the horizontal shift register 40 before succeeding information charges are transferred to the shift register 40 from the vertical shift registers 30.

When the horizontal shift register 40 finishes the horizontal transfer at the time T10, the clock pulse HS1 is set to the level L while the clock pulse HS2 is set to the level H. The transfer gates 42 of the vertical shift registers 30 on the odd-numbered columns are turned off, and the potential well disappears. Then, the transfer gates 42 of the vertical shift registers 30 on the even-numbered columns are turned on, thereby forming a potential well.

The clock pulse TG2 has the level H at the time T11. The output-control gate electrode 35 is turned on, forming a potential well. The information charges are reserved in the channel region 31 under the output-control gate electrodes 34 of the vertical shift registers 30 on the even-numbered columns, and then transferred to the channel region 41 under the gate transfer electrode 42 of the horizontal shift register 40.

At the time T12, the clock pulse TG1 has the level L, the output-control gate electrode 34 is turned off, and the potential well disappears.

When the clock pulse TG2 has the level L at the time T13, the output-control gate electrode 35 is turned off, and the potential well disappears. The clock pulses HS1 and HS2 are repeatedly reversed while the vertical shift registers 30 maintain the state at the time T13. The information charges are horizontally transferred from the channel region under the transfer gate electrode 42 corresponding to the vertical shift registers 30 on the even-numbered columns. The horizontal transfer of the information charges are similarly performed for the channel regions of the transfer gate electrodes 42 corresponding to the vertical shift registers 30 on the odd-numbered columns.

The repeated operations of the foregoing transfer gate electrodes at the times T1 to T13 and the horizontal transfer of the horizontal shift register 40 enable the information charges of each half line signal to be sequentially read out from the vertical shift registers 30. According to this method, the information charges for one line of the signal are divided into the information charges of the odd-numbered columns and the information charges of the even-numbered columns. These two signal charge groups are handled separately. Therefore, the image pickup device of the present invention is preferable to a color solid-state image pickup device which includes color filters for passing different color components on even- and odd-numbered pixels. To obtain picture signals which are in a predetermined sequence, the information charges for the odd-numbered columns are first reserved in a line memory which can store signals of a half row. Then, the signals charges reserved in the line memory and the information charges for the even-numbered columns are alternately picked up.

According to the invention, the solid-state image pickup device uses the output-control gate electrodes 34, 35 so as to reserve information charges, of the vertical shift registers on the even-numbered columns, for half of the horizontal scanning period. The information charges are alternately read out from the vertical shift registers on the odd-numbered and even-numbered columns. Thus, it is possible to reduce the number of bits of the horizontal shift register for receiving outputs from a plurality of vertical shift registers. Specifically, the horizontal shift register has two transfer gate electrodes for each vertical shift register. This reduces the number of horizontal transfer gate electrodes, and enables the pitch of the vertical shift registers to be reduced. Therefore, resolution of the image pickup device can be improved by increasing its integration, and the production cost of the image pickup device can be reduced by making semiconductor chips smaller.

The solid-state image pickup device of the invention enables pictures signals, from pixels on even-numbered columns and those from pixels on odd-numbered columns, to be separately obtained. Therefore, when the image pickup device of the invention has color filters in which colors on the odd-numbered and even-numbered pixels are different, color components can be easily separated, and the picture signals can be processed in a simplified manner.

Figure 8:
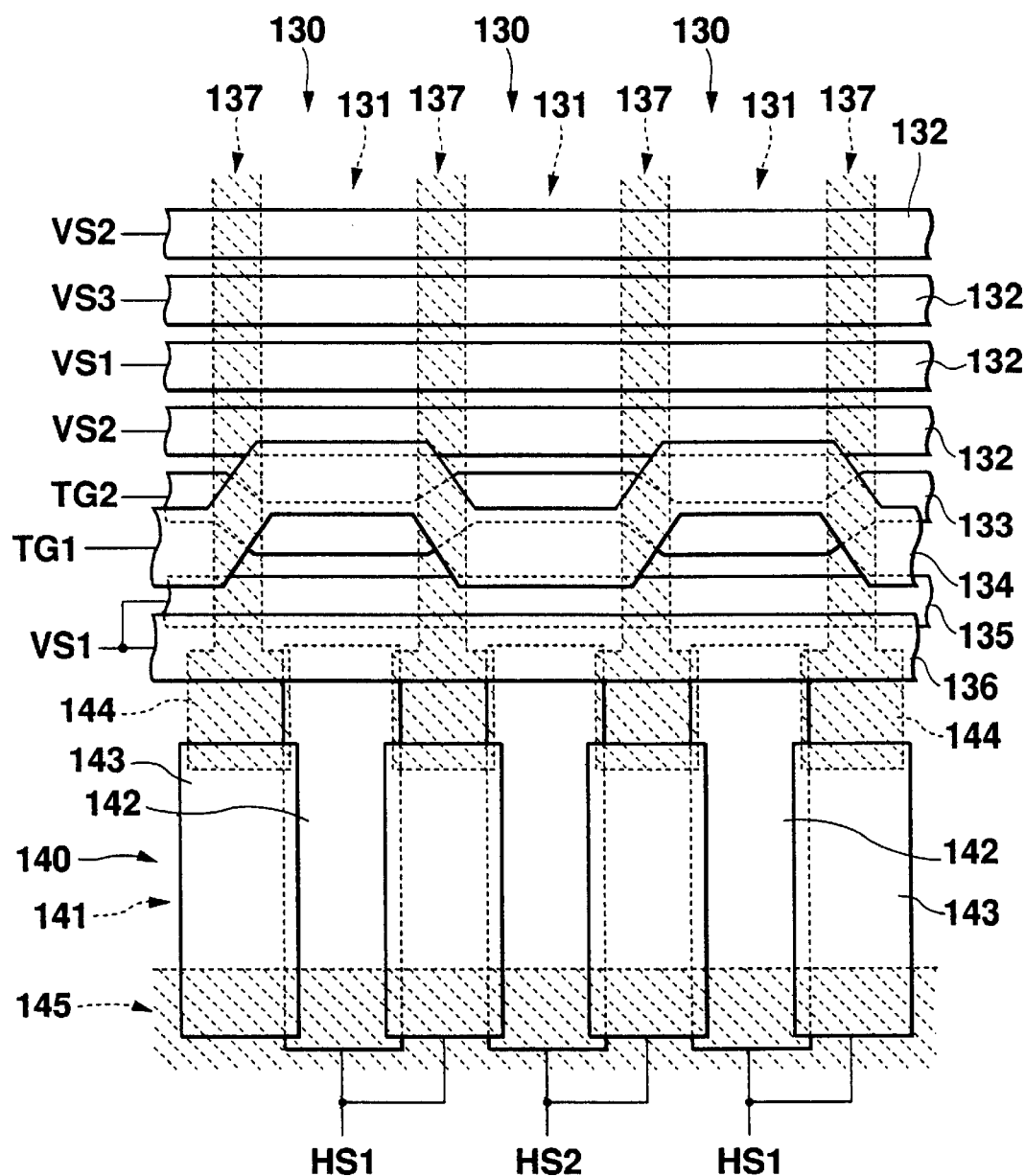
FIG. 8 is a plan view showing the configuration of a connecting part between vertical shift registers and a horizontal shift register according to a second embodiment of the invention.

A solid-state image pickup device of a second embodiment will be described with reference to FIG. 8, which shows the connection between a plurality of vertical shift registers 130 and a horizontal shift register 140. This connection is applicable to both frame transfer type and frame interline type solid-state image pickup devices, similarly to the solid-state image pickup device of the first embodiment.

Each vertical shift register 130 includes a channel region 131, a plurality of transfer gate electrodes 132, and first to fourth output-control gate electrodes 133, 134, 135, 136. The output-control gate electrodes 133 and 134 are paired, and output-control gate electrodes 135 and 136 are paired. In the solid-state image pickup device, the channel regions 131 are defined by a plurality of Juxtaposed channel-stop regions 137, and are electrically independent. Each channel region 131 is a buried channel in which an N-type region embedded on a P-type region.

The transfer gate electrodes 132 are arranged on the channel regions 131 such that they are in parallel with one another and intersect the channel-stop regions 137. In this embodiment, the transfer gate electrodes 132 are arranged in a single layer. Alternatively, they may be arranged in two layers. The first output-control gate electrode 133 is juxtaposed with the transfer gate electrode 32 at the output side of the vertical shift registers 30, and meanders on the vertical shift registers 130. Specifically, the first output-control gate electrode 133 are away from the transfer gate electrodes 132 of the vertical shift registers 130 on odd-numbered column, and come near the transfer gate electrodes 132 of the vertical shift registers 130 on even-numbered columns. Contrary to the first output-control gate electrode 133, the second output-control gate electrode 134 comes near the transfer gate electrodes 132 of the vertical shift registers 130 on odd-numbered columns and are away from the transfer gate electrodes 132 of the vertical shift registers 130 on even-numbered columns. The first and second output-control gate electrodes 133 and 134 cross each other on the channel-stop regions 137. In other words, these electrodes 133 and 134 are arranged in two layers, and alternately meander on different transfer gate electrodes 132 of the vertical shift registers 130 on the even- and odd-numbered columns. This meandering arrangement the electrodes 133 and 134 enables the information charges in the channel regions 131 of the vertical shift registers 130 on the even- and odd-numbered columns to be made different from each other in a direction along the vertical shift registers.

The third output-control gate electrode 135 is adjacent to the first output-control gate electrode 133 of the vertical shift registers 130 on the odd-numbered columns, and overlaps with the second output-control gate electrode 134 of the vertical shift registers 130 on the even-numbered columns. Further, the third output-control gate electrode 135 is in parallel to the transfer gate electrode 132, and is positioned at a horizontal shift register side of the first and second output-control gate electrodes 133 and 134. The fourth output-control gate electrode 136 overlaps with the third output-control gate electrode 135, and is positioned near the horizontal shift register 140. The third and fourth output-control gate electrodes 135 and 136 are electrically connected.

The transfer gate electrodes 132 and the output-control gate electrodes 133 to 136 commonly serve for the vertical shift registers 130.

Three-phase vertical transfer clock pulses VS1 TO VS3 are applied to the transfer gate electrodes 132, respectively. Output-control clock pulses TG1 and TG2 are applied to the first and second output-control gate electrodes 133 and 134. The third and fourth output-control gate electrodes 135 and 136 receive the vertical transfer clock pulse VS1, which has the same phase as that of the transfer clock pulse applied to the second transfer gate electrode 132 viewed from a side of the first output-control gate electrode 133. In response to the vertical transfer clock pulses VS1 to VS3, the information charges are sequentially and vertically transferred from the channel regions 131. Under the output-control electrodes, the information charges for the vertical shift registers 130 on the odd-number columns and on the even-number columns are transferred for different distances in response to the output-control clock pulses TG1 and TG2. One group of the sorted information charges is temporarily stored in the channel regions 131 of the vertical shift registers 130.

The horizontal shift register 140 is similarly structured as the horizontal shift register 40 In the first embodiment, and will not be repeatedly described here.

Figure 9:
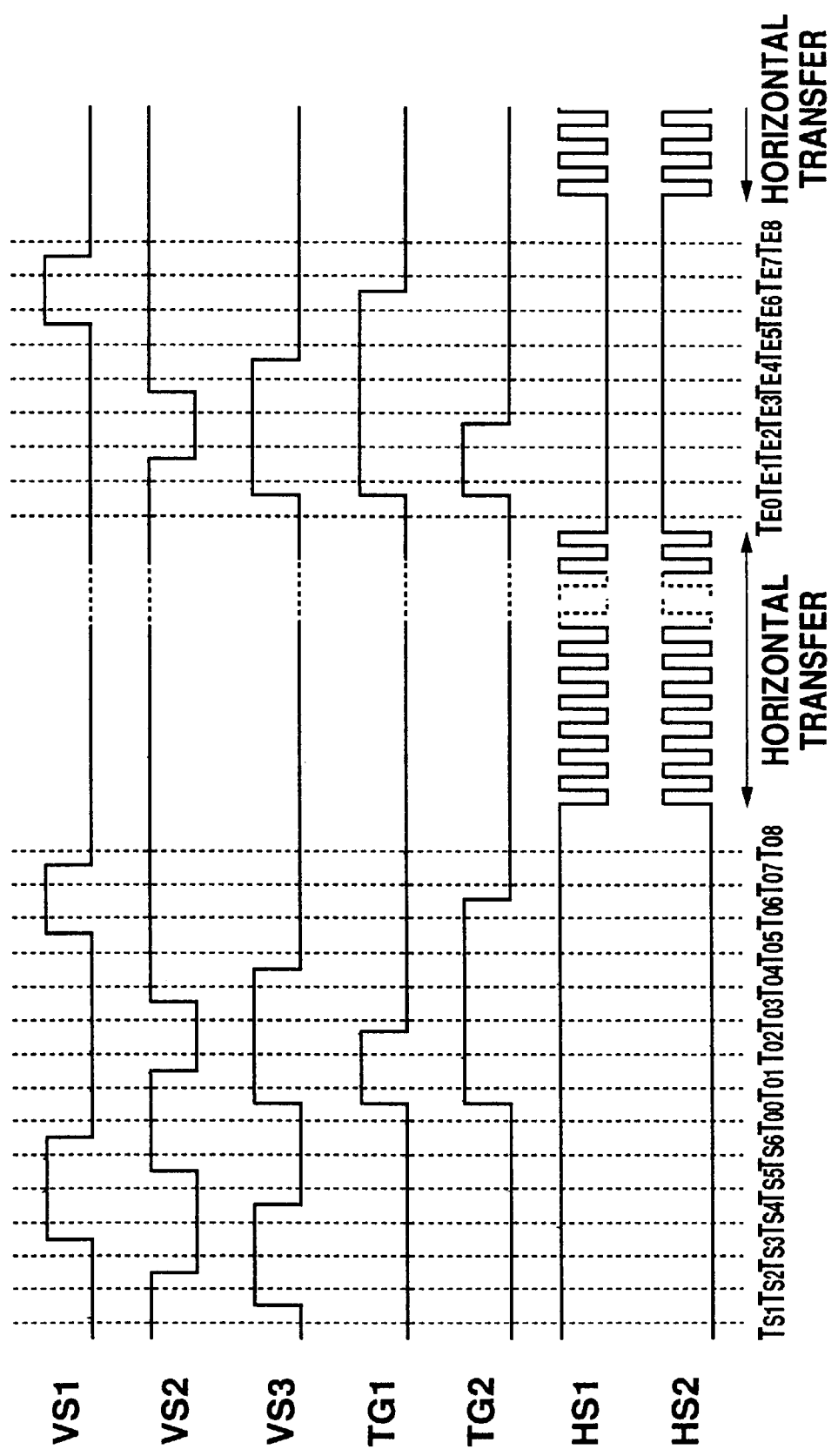
FIG. 9 is a timing chart of clock pulses used for operating the solid-state image pickup device of the second embodiment.
Figure 10:
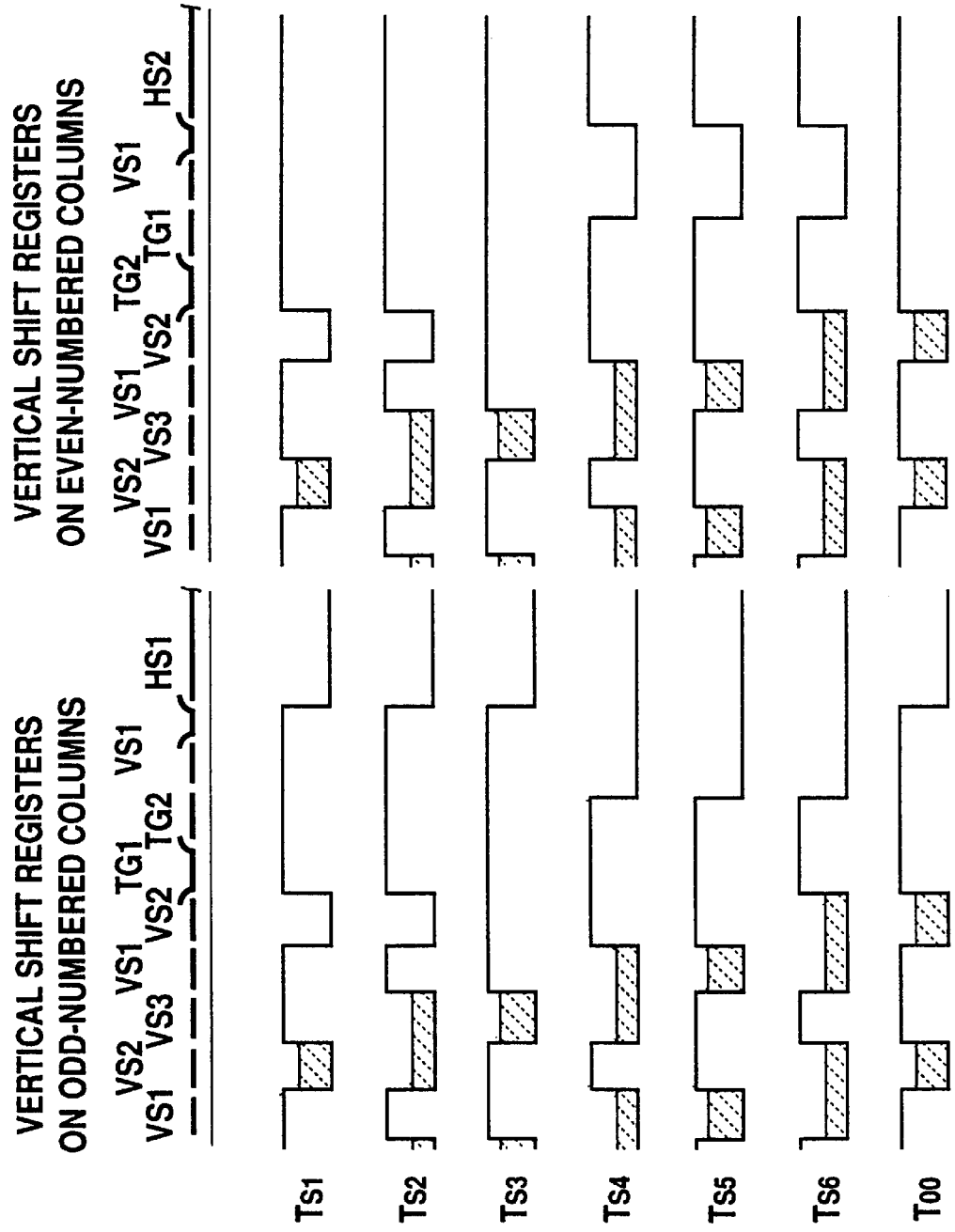
FIG. 10 is a diagram showing potentials for describing a method of operating the solid-state image pickup device of the second embodiment, particularly showing potentials at different times during vertical transfer of information charges in vertical shift registers on odd-numbered and even-numbered columns.
Figure 11:
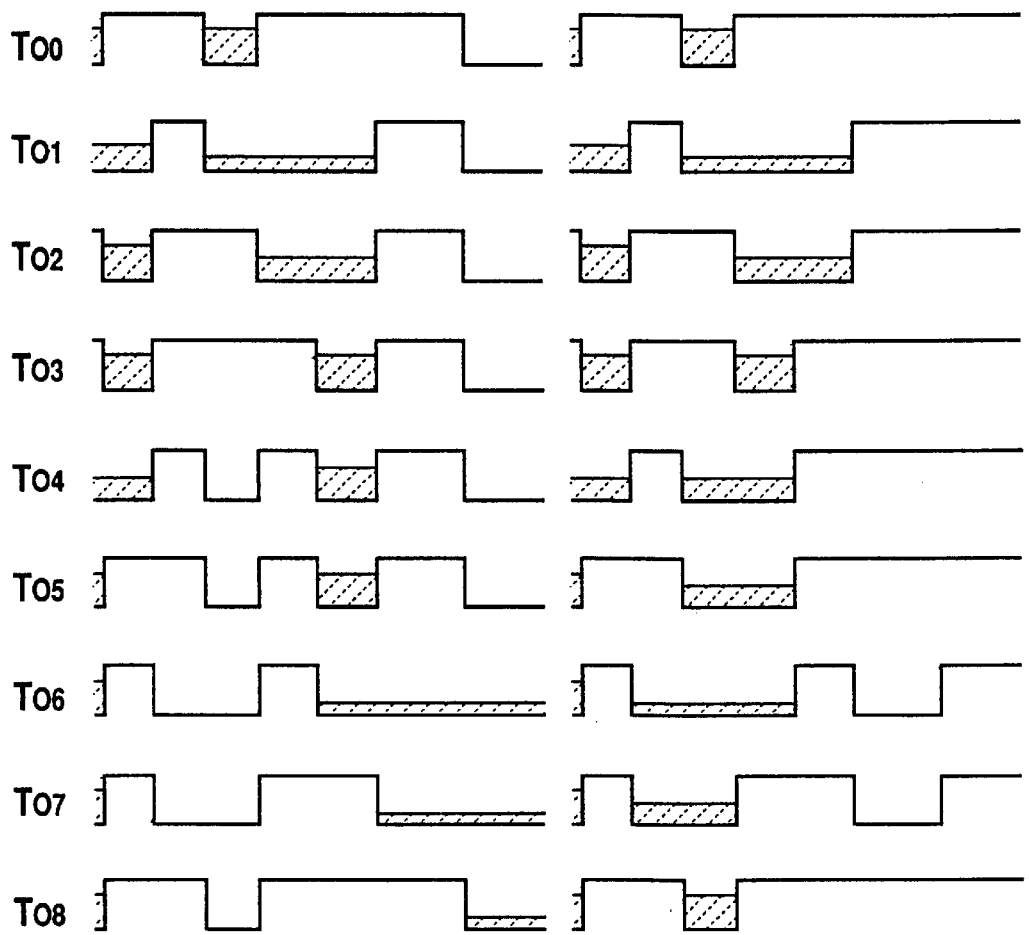
FIG. 11 is a diagram showing potentials for describing a method of operating the solid-state image pickup device of the second embodiment, particularly showing potentials at different times during transfer of information charges to the horizontal shift register from vertical shift registers on odd-numbered and even-numbered columns.
Figure 12:
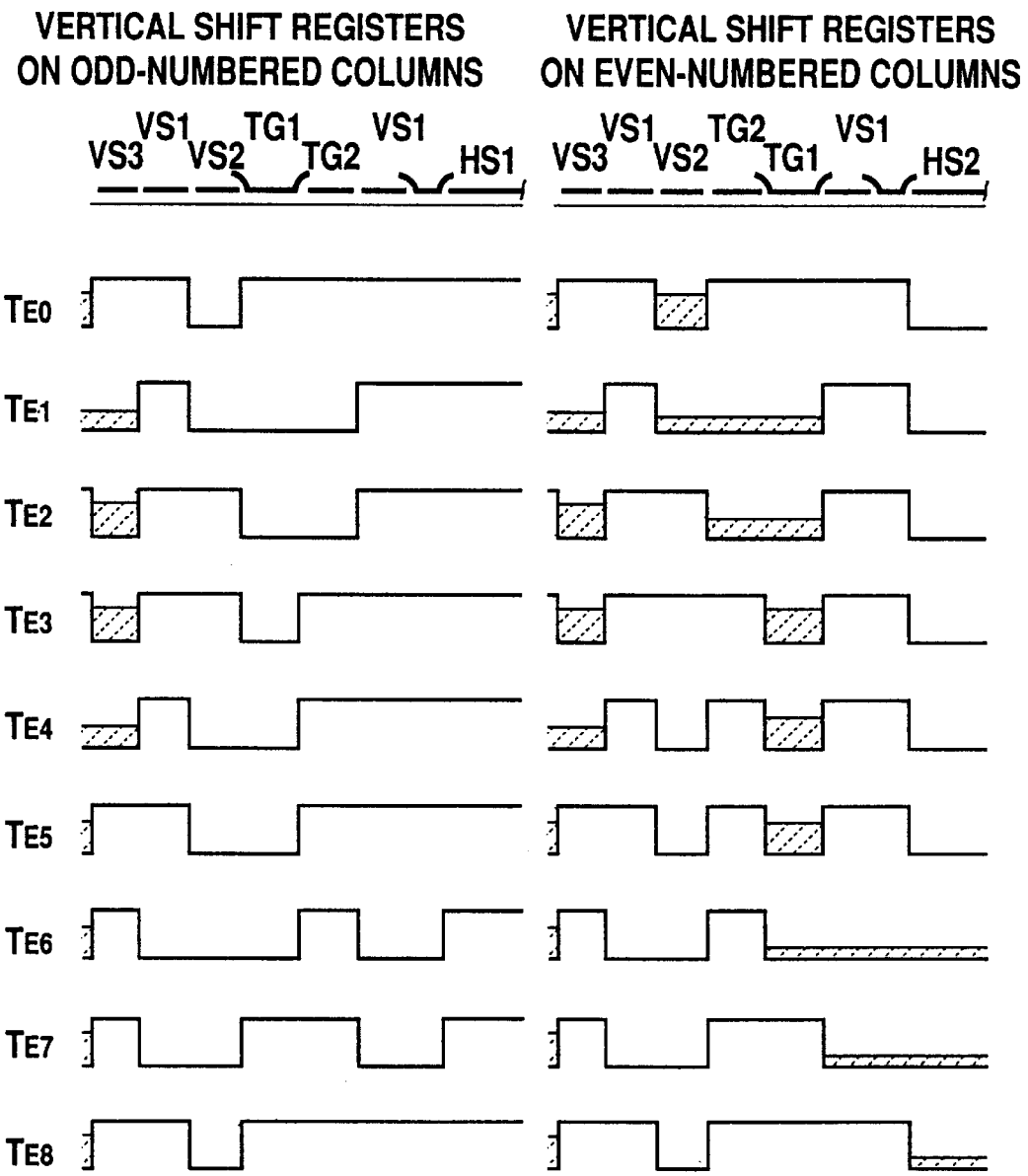
FIG. 12 is a diagram showing potentials for describing a method of operating the solid-state image pickup device of the second embodiment, particularly showing potentials at different times during transfer of information charges to the horizontal shift register from vertical shift registers on odd-numbered and even-numbered columns.

FIG. 9 shows the timing of the vertical transfer clock pulses VS1–VS3, the output-control clock pulses TG1 and TG2, and the horizontal transfer clock pulses HS1 and HS2. FIGS. 10 to 12 show states of potentials in the channel regions 131 and 141 at times TS1–TS6, TO0–TO8, and TE0–TE8. The gate electrodes are turned on when the clock pulses have the level H and are turned off when the clock pulses have the level L.

Referring to FIG. 10, one bit of the information charges is vertically transferred from the channel regions 131 during the times TS1–TS6.

When the clock pulse VS2 has the level H and the clock pulses VS1 and VS3 have the level L at time TS1, the transfer gate electrode 132 responsive to the clock pulse VS2 is turned on, and a potential well will be formed so as to store the information charges. Since the information charges have been transferred in the previous transfer operation, no information charges are stored in a potential well, which is formed in the channel region 131 under the transfer gate electrode 132 adjacent to the output-control gate electrodes 133 and 134. Both the clock pulses TG1 and TG2 have the level L, so the output-control gate electrodes 133 and 134 are in the off-state.

When the clock pulse VS3 has the level H at the time TS2, the transfer gate electrode 132 responsive to the clock pulse VS3 is turned on, so a potential well is formed.

Next, the clock pulse VS2 has the level L at the time TS3, and the transfer gate electrode 32 responsive to the clock pulse VS2 is turned off. The potential well is made to disappear. Thus, the information charges will be transferred from the channel region 131 under the transfer gate electrode 32 responsive to the clock pulse VS2 to the channel region 131 under the transfer gate electrode 132 responsive to the clock pulse VS3.

Similarly, the clock pulses VS1 to VS change their levels H to L or vice versa in the predetermined order. Then, potential wells are sequentially formed in the channel regions 131. The information charges are transferred from the channel regions 131 to the output-control gate electrodes 133 and 134. During this time, a potential well is temporarily formed, in response to the variation of the clock pulse TS1, in the channel regions 131 under the output-control gate electrodes 133 and 134. However, since the output-control gate electrode 133 and 134 are off, the information charges in the channel regions 131 can be transferred without any problem.

When the clock pulse VS2 has the level H and the clock pulses VS1 and VS3 have the level L at the time TO0, the transfer gate electrode 132 responsive to the clock pulse VS2 is turned on, and a potential well is formed so as to store the information charges. In this state, the information charges are transferred from the channel regions 131 of the vertical shift registers 130 on the odd-numbered columns to the channel region 141 of the horizontal shift register 140. During the times TS1 to TO0, the information charges are transferred in the similar manner with respect to the vertical shift registers 130 on the even-numbered columns.

As shown in FIG. 11, at the times TO0 to TO8, the information charges are transferred from the channel regions 131 of the vertical shift registers 130 on the odd-numbered columns to the channel region 141 of the horizontal shift register 140.

At the time TO0 when the vertical transfer of the information charges is completed, the clock pulse HS1 maintains the level H and the clock pulse HS2 maintains the level L. The transfer gate electrodes 142 of the vertical shift registers 130 on the odd-numbered columns are turned on, so a potential well is formed. However, the transfer gate electrodes 142 of the vertical shift registers 130 on the even-numbered columns are in the off-state, and do not form any potential well.

When the clock pulses VS3, TG1 and TG2 have the level H at the time TO1, the transfer gate electrode 132 responsive to the clock pulse VS3 and the output-control gate electrodes 133 and 134 are turned on, forming a potential well.

At the time TO2 when the clock pulse VS2 has the level L, the transfer gate electrode 132 responsive to the clock pulse VS2 is turned off, making the potential well disappear. Thus, the information charges are transferred from the channel region 131 under the transfer gate electrode 132 responsive to the clock pulse VS3 to the channel region 131 under the output-control gate electrodes 133 and 134.

The clock pulse TG1 has the level L at the time TO3. The output-control gate electrode 134 is turned off, thereby making the potential well disappear. The information charges are transferred from the channel regions 131 under the output-control gate electrode 134 are moved to the channel regions 131 under the output-control transfer gate 133. The positions of the output-control gate electrodes 133 and 134 are reversed in the vertical shift registers 130 on the odd- and even-numbered columns. In the vertical shift registers 130 on the odd-numbered columns, the information charges are transferred from the channel regions 131 to the channel regions 131 of the output-control gate electrode 135. On the other hand, in the vertical shift registers 130 on the even-numbered columns, the information charges are transferred to the transfer gate electrode 132.

When the clock pulse VS2 has the level H at the time TO4, the transfer gate electrode 132 responsive to the clock pulse VS2 Is turned on, thereby forming a potential well.

At the time TO4, the clock pulse VS2 has the level H. Thus, the transfer gate electrode 132 responsive to the clock pulse VS2 is turned on, and forms a potential well.

The clock pulse VS3 has the level L at the time TO5. The transfer gate electrode 132 responsive to the clock pulse VS2 is turned off, making the potential well disappear. Thus, in the vertical shift registers 130 on the even-numbered columns, the information charges in the channel regions 131 under the output-control gate electrodes 133 reach the channel region 131 under the transfer gate electrode 132 responsive to the clock pulse VS2. In this state, the output-control gate electrodes 134 are in the off-state in the vertical shift registers 130 on the odd-numbered columns. Thus, no information charges are transferred from the channel regions 131 under the output-control gate electrodes 133. In this state, the information charges are transferred from the channel regions 131 under the transfer gate electrodes 132 of the vertical shift registers 130 on both the odd- and even-numbered columns to the channel regions 131 under the transfer gate electrodes 132 responsive to the clock pulse VS2, and are stored in these channel regions 131.

When the clock pulse VS1 has the level H at the time TO6, the output-control gate electrodes 135 and 136 are turned on, thereby forming a potential well. In the vertical shift registers 130 on the odd-numbered columns, the potential well under the output-control gate electrode 133 is connected to the potential well under the transfer gate electrode 142. Thus, the Information charges are transferred from the channel regions 131 are transferred to the channel regions 141 of the horizontal shift register 140. In the vertical shift registers 130 on the even-numbered columns, the output-control gate electrode 134, which is present between the output-control gate electrode 133 and the output-control gate electrodes 135 and 136, is in the off-state. Thus, no information charges are transferred from the channel region 131 under the output-control gate electrode 133 to the horizontal shift register 140.

When the clock pulse TG2 has the level L at the time TO7, the output-control gate electrode 133 is turned off, making the potential well disappear.

At the time TO8, the clock pulse VS1 has the level L, and the transfer gate electrode 132 responsive to the clock pulse VS1 and the output-control gate electrodes 135, 136 are turned off, thereby making the potential well disappear. Therefore, in the vertical shift registers 130 on the odd-numbered columns, the information charges are transferred from the channel regions 131 under the output-control gate electrodes 133 to the channel regions 141 under the transfer gate electrodes 142 of the horizontal shift register 140. In the vertical shift registers 130 on the even-numbered columns, the foregoing information charges are transferred from the channel regions 131 under the output-control gate electrode 133 to the channel regions 131 under the transfer gate electrode 132 responsive to the clock pulse VS2. In other words, the information charges are transferred to the different destinations in accordance with the vertical shifts registers 130 on the odd- and even-numbered columns. In the state at the time TO8, the clock pulses HS1 and HS2 are repeatedly reversed, so the information charges are horizontally transferred through the channel regions 141 of the horizontal shift register 140.

Cycles of the clock pulses HS1 and HS2 are determined such that a half row of the information charges is transferred within a predetermined period of time. Therefore, all the information charges are externally transferred from the channel regions 141 of the horizontal shift register 140 before succeeding information charges arrive from the vertical shift registers 130.

Referring to FIG. 12, at the time TE0 to TE8, the information charges are transferred from the channel regions 131 of the vertical shift registers on the even-numbered columns to the channels regions 141 of the horizontal shift register 140.

When the horizontal shift register 140 finishes its horizontal transfer operation at the time TE0, the clock pulse HS1 is kept at the level L while the clock pulse HS2 is kept at the level H. Thus, the transfer gate electrodes 142 in the vertical shift registers 130 on the even-numbered columns are turned on, thereby forming a potential well. On the contrary, in the vertical shift registers 130 on the odd-numbered columns, no information charges have been stored in the channel regions 131 under the output-control gate electrodes 133 to 136, and in the channel region 131 under the transfer gate electrode adjacent to the output-control gate electrodes 133 and 134.

When the clock pulses VS3, TG1 and TG2 have the level H at the time TE1, the transfer gate electrode 132 responsive to the clock pulse VS2 having the level L is turned on, thereby forming a potential well. At the time TE3, the clock pulse VS2 has the level L, and the transfer gate electrode 132 responsive to VS2 is turned off, thereby making the potential well disappear. Thus, the information charges are transferred from the channel region 131 under the transfer gate electrode 132 (responsive to the clock pulse VS2) to the channel regions 131 under the transfer electrode 132 responsive to the clock pulse VS3 and the channel regions 131 under the output-control gate electrodes 133 and 134.

At the time TE3, the clock pulse TG2 has the level L. The output-control gate electrode 133 is turned off, making the potential well disappear. Then, the information charges in the channel regions 131 under the output-control gate electrodes 133 and 134 are collected to the channel regions 131 under the output-control gate electrode 134, i.e. in the channel regions 131 near the transfer gate electrodes 132 in the vertical shift registers 130 on the even-numbered columns.

When the clock pulse VS2 has the level H at the time TE4, the transfer electrode 132 responsive to the clock pulse VS2 is turned on, forming a potential well. At the time TE5, the clock pulse VS3 has the level L. Then transfer gate electrode 132 responsive to the clock pulse VS2 is turned off, thereby making the potential well disappear. Thus, in the vertical shift registers 130 on the odd- and even-numbered columns, the information charges are transferred from the channel regions 131 under the transfer gate electrodes 132, responsive to the clock pulse VS3, to the channel regions 131 under the transfer gate electrodes 132 responsive to the clock pulse VS2.

At the time TE6 when the clock pulse VS1 has the level H, the output-control gate electrodes 135 and 136 are turned on, forming a potential well. In the vertical shift registers 130 on the even-numbered columns, the potential well under the output-control gate electrode 134 is connected to the potential well under the transfer gate electrode 142. The information charges are transferred from the channel regions 131 to the channel regions 141 of the horizontal shift register 140.

The clock pulse TG1 has the level L at the time TE7. The output-control gate electrode 134 is turned off, making its potential well disappear.

When the clock pulse VS1 has the level L at the time TE8, the transfer gate electrode 132 responsive to the clock pulse VS1 and the output-control gate electrodes 135 and 136 are turned off, making their associated potential well disappear. Then, the clock pulses HS1 and HS2 which have been held until now are repeatedly reversed while the vertical shift 130 are maintained in the state at the time TE8. Thus, the information charges under the transfer gate electrodes 142 are horizontally transferred from the channel regions 141 through the horizontal shift register 140. The horizontal transfer operation is carried out in a similar manner as the horizontal transfer operation for the information charges from the vertical shift registers 130 on the odd-numbered columns as described above.

A potential well has been formed under the transfer gate electrode 132 adjacent to the output-control gate electrodes 133 and 134, but have no signal charged stored therein after the completion of transfer of the information charges.

Each half row of the information charges is transferred from the vertical shift registers 130 to the horizontal shift register 140 through not only the repeated operations of the transfer gate electrodes and the output-control gate electrodes but also the horizontal transfer operation of the horizontal shift register at the times TS1–TS6, TO0–TO8, and TE0–TE8. According to this method, each row of the information charges in the vertical shift registers on the odd- and even-numbered columns can be separately read. Therefore, when the solid-state image pickup device of the second embodiment has color filters in which colors on the odd-numbered and even-numbered pixels are different, color components can be easily separated, and the picture signals can be processed in a simplified manner. The image sensor of the second embodiment is as effective as that of the first embodiment.

Figure 13:
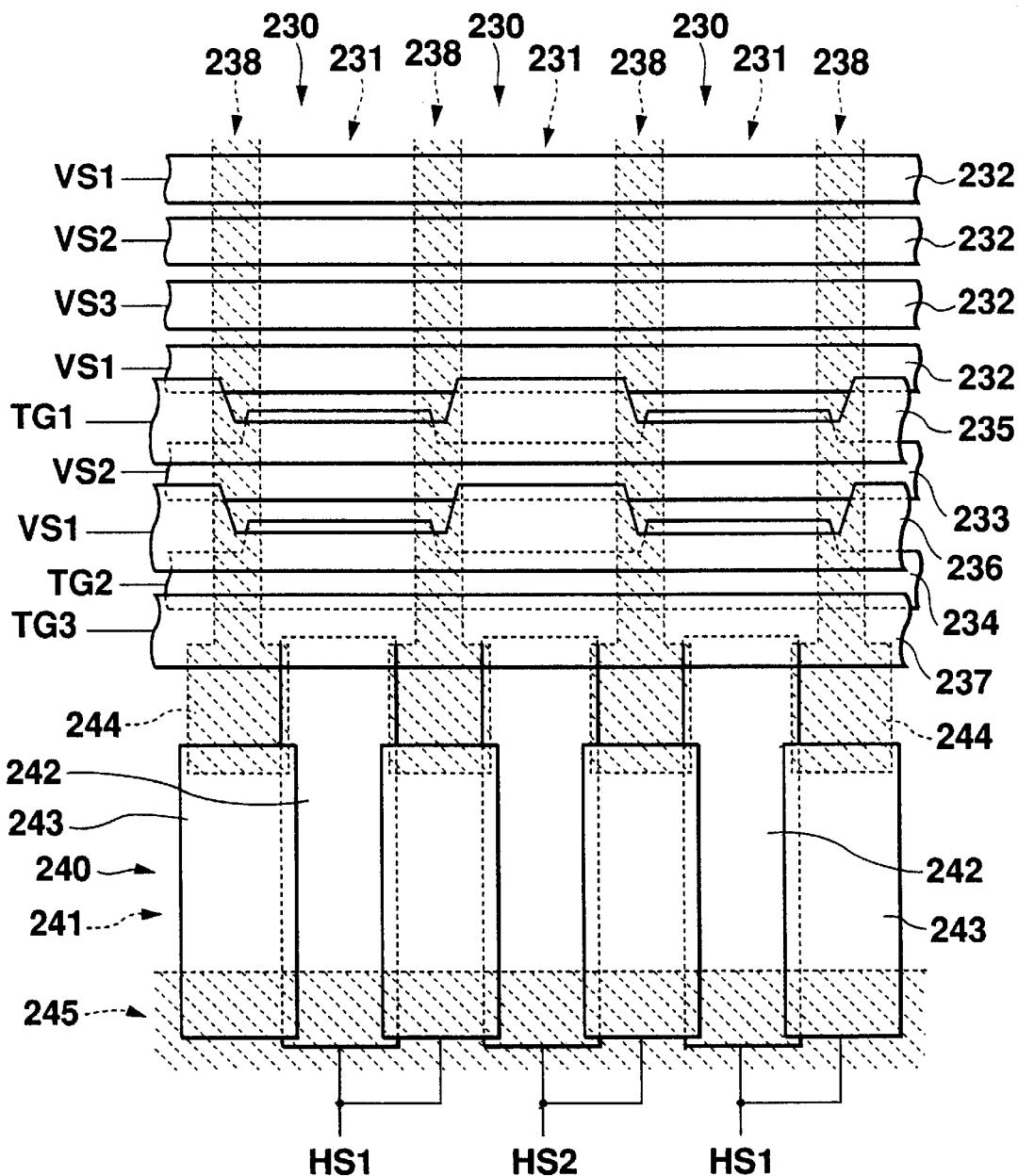
FIG. 13 is a plan view showing a part for connecting vertical shift registers and a horizontal shift register of a solid-state image pickup device according to a third embodiment.

A solid-state image pickup device is configured as shown in FIG. 13 according to a third embodiment of the invention. In this image pickup device, vertical shift registers 230 and a horizontal shift register 240 are connected as shown. This connection method is also applicable to frame transfer type or frame interline type solid-state image pickup devices similar to the first and second embodiments.

Each vertical shift register 230 includes a channel region 231, a plurality of transfer gate electrodes 232, first output-control gate electrodes 233 and 234, and second output-control gate electrodes 235–237.

The channel regions 231 are defined by a plurality of juxtaposed channel-stop regions 238, and are electrically independent. The channel regions 231 are buried channels in which an N-type region is implanted on a P-type region.

The transfer gate electrodes 232 are arranged in parallel with one another on the channel regions 231 and intersect the channel-stop regions 238. The transfer gate electrodes 232 have a single-layer structure.

Alternatively, they can have a two-layer structure in which they overlap one another.

The output-control gate electrodes 233 and 234 have a two-layer structure. The output-control gate electrodes 233, 234 on a first layer are wide in the vertical shift registers 230 on the odd-numbered columns, and are narrow in the vertical shift registers 230 on the even-numbered columns. The output-control gate electrodes 233 and 234 are arranged in parallel to the transfer gate electrodes 232.

The output-control gate electrodes 235, 236 on a second layer are narrow in the vertical shift registers 230 on the odd-numbered columns, and are wide in the vertical shift registers 230 on the even-numbered columns. These output-control gate electrodes 235, 236 overlap with the transfer gate electrode 232 and the output-control gate electrodes 233, 234. In this state, in the vertical shift registers 230 on the odd-numbered columns, the output-control gate electrodes 235, 236 are aligned on the output-control gate electrodes 233, 234. In the vertical shift registers 230 on the even-numbered columns, the output-control gate electrodes 235, 236 are superimposed so as to cover gaps between the transfer gate electrodes 232 and the output-control gate electrodes 233, 234. Therefore, the output-control gate electrode 235 on the second layer are effective for the channels regions 231 in the vertical shift registers 230 on only the even-numbered columns. The output-control gate electrode 237 on the second layer overlaps with the output-control gate electrode 234 at an output end of the vertical shift register 230, and are arranged in parallel to the output-control gate electrodes 235, 236.

The transfer gate electrodes 232, the output-control gate electrodes 233 and 234 on the first layer, and the output-control gate electrodes 235–237 on the second layer serve for the vertical shift registers 230.

Three-phase transfer clock pulses VS1–VS3 are applied to the transfer gate electrodes 232, for example. A vertical transfer clock pulse VS2 and an output-control pulse TG2 are applied to the output-control gate electrodes 233 and 234 on the first layer. The transfer clock pulse VS2 has the same pulse as the phase of the transfer clock pulse VS2 applied to the third transfer gate electrode 232 viewed from the output-control electrode 233. A vertical transfer clock pulse VS1 and an output-control clock pulse TG3 are applied to the output-control gate electrodes 235–237. The transfer clock pulse VS1 has the same phase as the phase of the transfer clock pulse VS1 applied to the first transfer gate electrode 232 viewed from the output-control gate electrode 235.

At the output sides of the vertical shift registers 230, only the potentials in the channel regions 231 in the vertical shift registers 230 on the even-numbered columns are affected by the output-control clock pulse TG1 and the vertical transfer clock pulse VS1. Thus, information charges, from pixels on a certain row of the vertical shift registers 230 on the odd-numbered columns, are transferred toward the horizontal shift register 240. During this time, the vertical shift registers 230 on the even-numbered columns reserve the information charges on their output sides.

The horizontal shift register 240 is similarly structured as the horizontal shift register 40 in the first embodiment, and will not be repeatedly described here.

Figure 14:
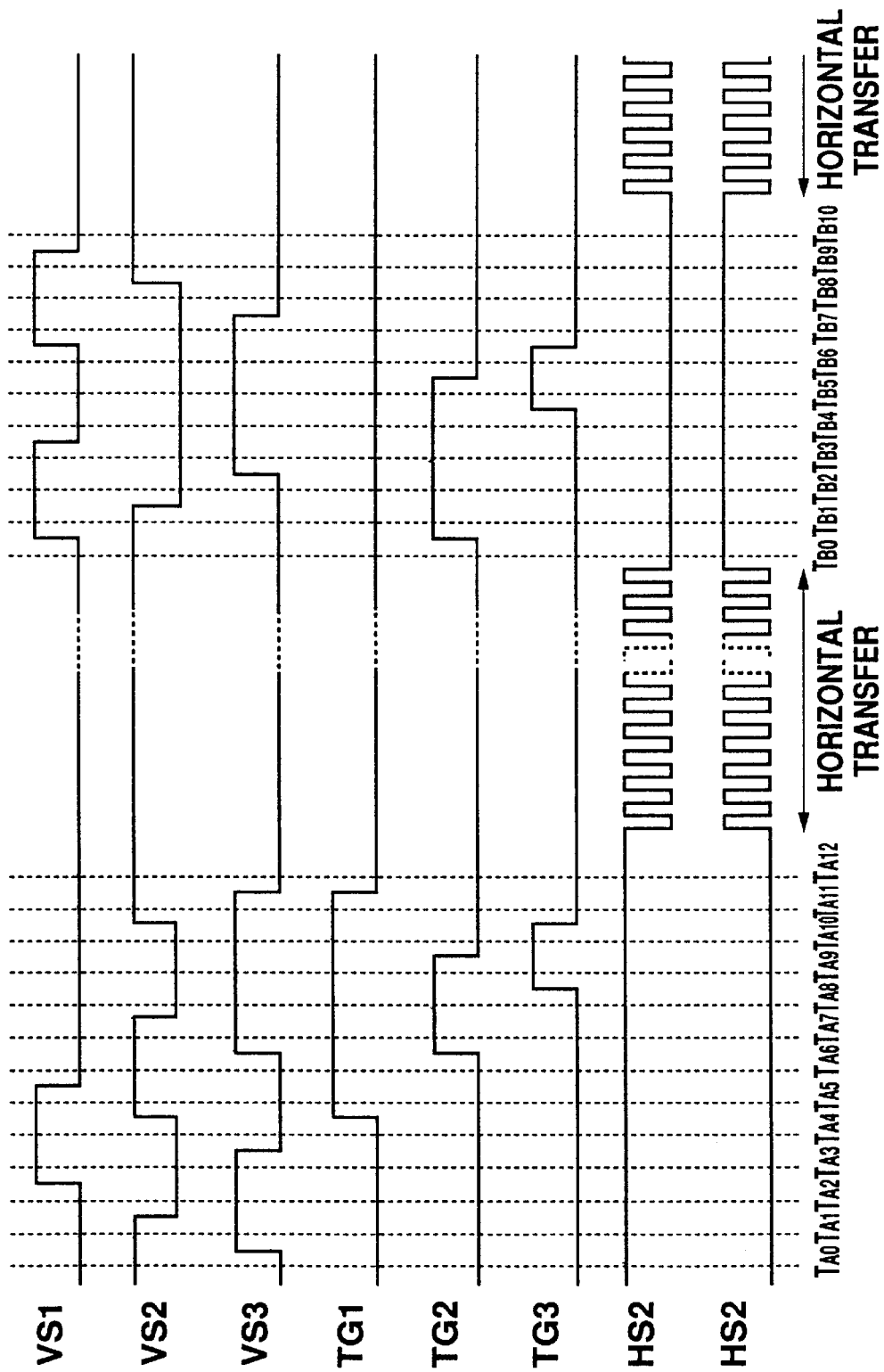
FIG. 14 is a timing chart showing clock pulses used to operate the solid-state image pickup device of the third embodiment.
Figure 15:
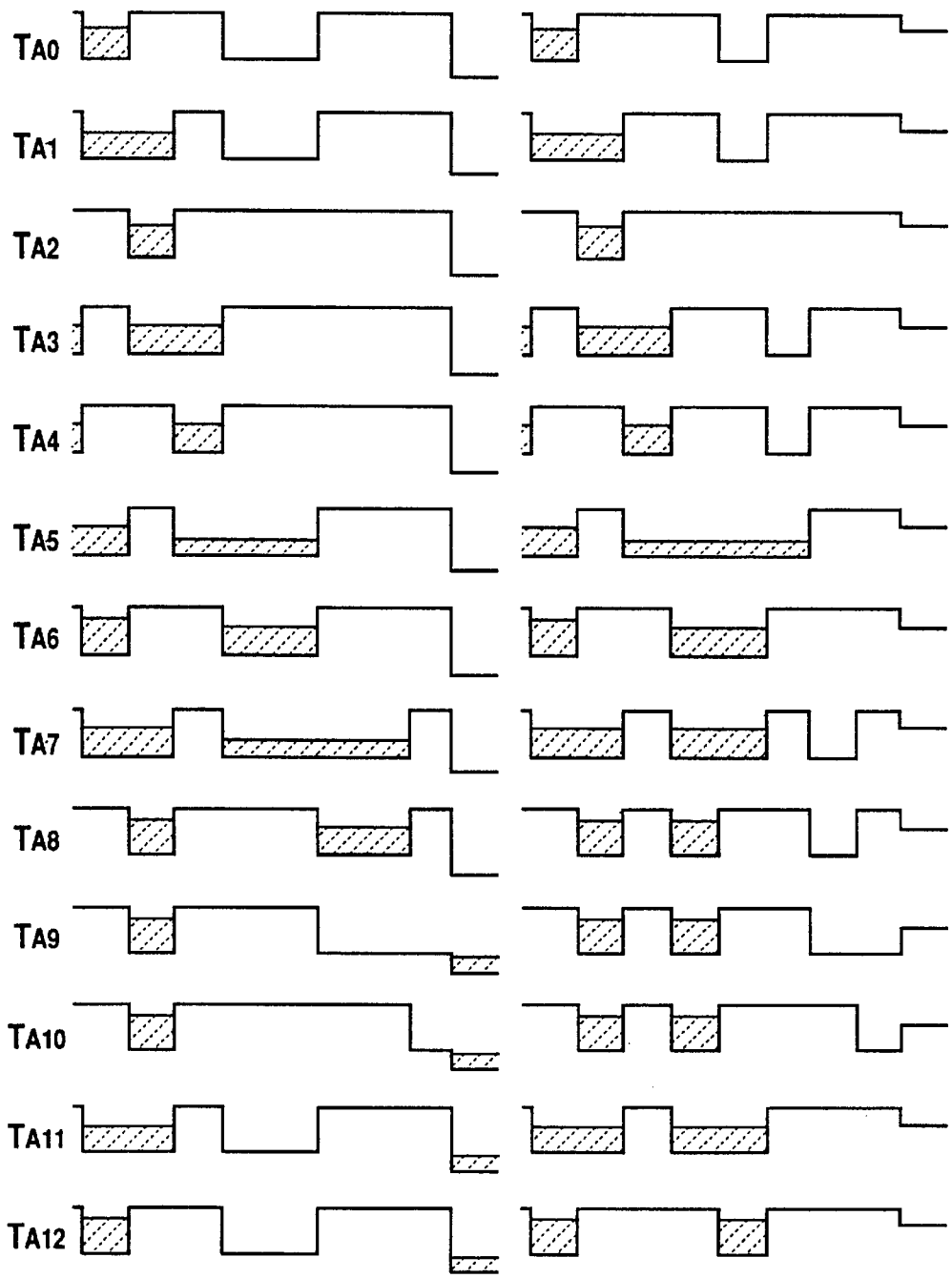
FIG. 15 is a diagram showing potentials for describing a method of operating the solid-state image pickup device of the third embodiment, particularly showing potentials at different times during transfer of information charges to the horizontal shift register from vertical shift registers on an odd-numbered and even-numbered columns.
Figure 16:
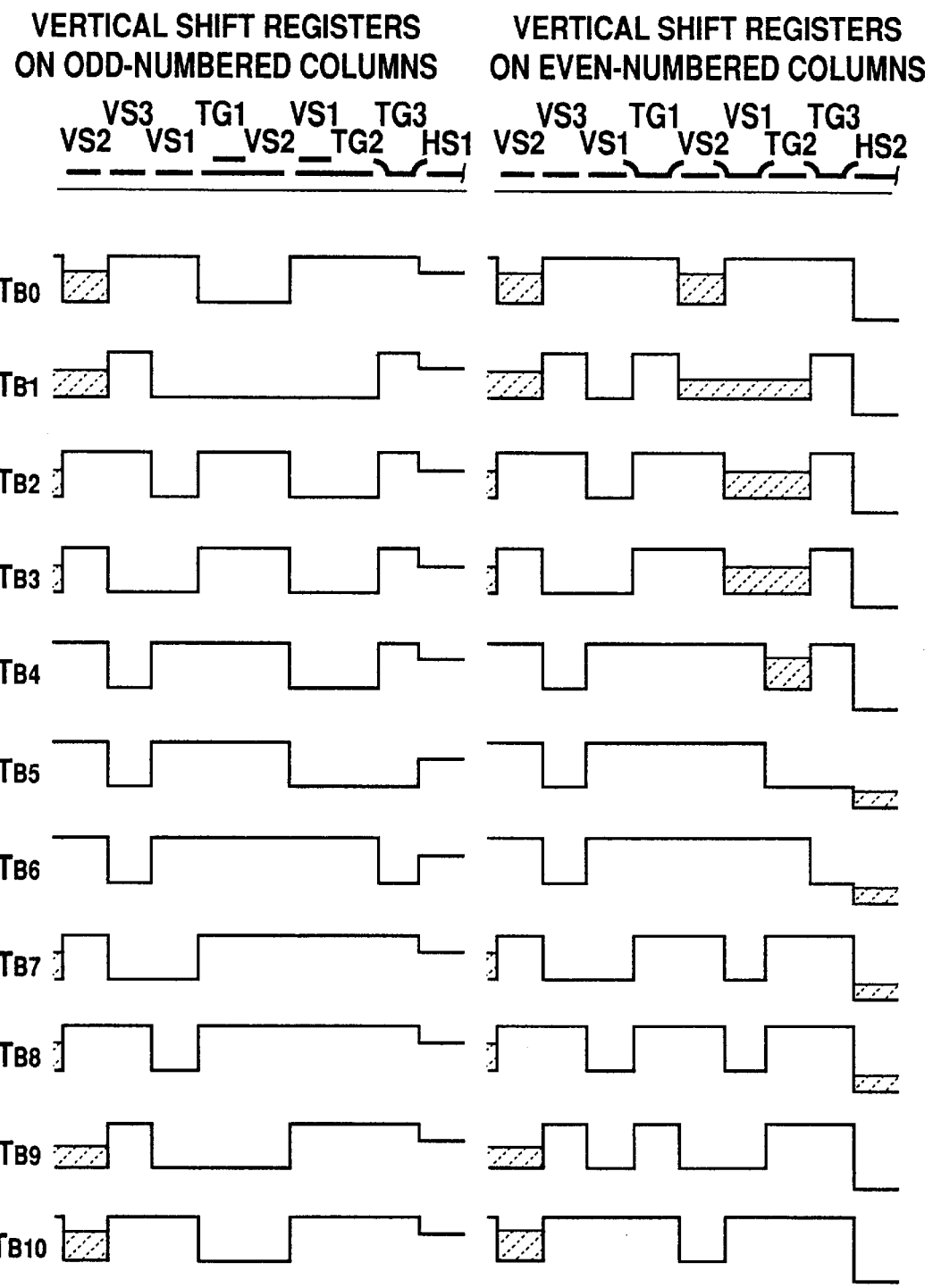
FIG. 16 is a diagram showing potentials for describing a method of operating the solid-state image pickup device of the third embodiment, particularly showing potentials at different times during transfer of information charges to the horizontal shift register from vertical shift registers on odd-numbered and even-numbered columns.

FIG. 14 is a chart showing timing to operate the solid-state image pickup device of the third embodiment. FIGS. 15 and 16 show states of potentials in the channel regions 231 and 241 at times TA0–TA12 and TB0–TB10. The gate electrodes are turned on when applied clock pulses have a level H, and are turned off when the clock pulses have a level L.

Referring to FIG. 14, the information charges are transferred from the channel regions 231, in the vertical shift registers 230 on the odd-numbered columns, to the channel region 241 of the horizontal shift register 240.

When the clock pulse VS2 has the level H and the clock pulses VS1 and VS3 have the level L at the time TA0, the transfer gate electrode 232 responsive to the clock pulse VS2 is turned on, thereby forming a potential well. The information charges are stored in this potential well. In this state, the potential well, formed in the channel region 231 under the output-control gate electrode 233 to which the vertical transfer clock pulse VS2 is applied, is vacant. This is because the information charges have been already transferred therefrom by the previous transfer operation.

The clock pulses TG1–TG3 have the level L, so the output-control gate electrodes 234–237 are in the off-state.

When the clock pulse VS3 has the level H at the time TA1, the transfer gate electrode 232 responsive to the clock pulse VS3 is turned off, so the potential well is formed. Then, the clock pulse VS2 has the level L at the time TA2, and the transfer gate electrode 232 responsive to the clock pulse VS2 is turned off, so the potential well disappears. Thus, the information charges are transferred from the channel region 231 under the transfer gate electrode 232 responsive to the clock pulse VS2 to the channel region 231 under the transfer gate electrode responsive to the clock pulse VS3.

The clock pulse VS1 has the level H at the time VS3, so the transfer electrode 232 responsive to the clock pulse VS1 is turned on. Then, when the clock pulse VS3 has the level L at the time TA4, the transfer gate electrode 232 responsive to the clock pulse VS3 is turned off. The information charges are transferred from the channel region 231, under the transfer gate electrode 232 responsive to the clock pulse VS3, to the channel region 231 under the transfer gate electrode 232 responsive to the clock pulse VS1. The information charges are transferred during the times TA0 to TA4 in the similar manner for both the vertical shift registers 230 on the odd-numbered and even-numbered columns.

At the time TA5, the clock pulses VS2 and TG1 has the level H. The transfer gate electrode 232 responsive to the clock pulse VS2 and the output-control gate electrodes 233, 235 are turned on, thereby forming a potential well. At the time TA6, the clock pulse VS1 has the level L, so the transfer gate electrode 232 responsive to the clock pulse VS1 is turned off, making the potential well disappear. Thus, the information charges are transferred from the channel region 231 under the transfer gate electrode 232 responsive to the clock pulse VS1 to the channel region 231 under the transfer gate electrode 232 responsive to the clock pulse VS2 and to the channel region 231 under the output-control gate electrodes 233 and 235. In this state, since the output-control gate electrode 234 is above the output-control gate electrode 236 in the vertical shift registers 230 on the odd-numbered columns, the potential under the output-control gate electrode 236 remains unchanged even when the clock pulse VS1 applied to the output-control gate electrode 234 changes its level.

The clock pulses VS3 and TG2 have the level H at the time TA7. The transfer gate electrode 232 responsive to the clock pulse VS3 and the output-control gate electrode 234 are is turned on, forming a potential well.

At the time TA8, the clock pulse VS2 has the level L, so the transfer gate electrode 232 and the output-control gate electrode 233 responsive to clock pulse VS3 are turned off, making the potential well disappear. Thus, the information charges are transferred from the channel region 231 under the transfer gate electrode 232 responsive to the clock pulse VS2 to the channel region 231 under the transfer gate electrode 232 responsive to the clock pulse VS3.

In the vertical shift registers 230 on the odd-numbered columns, the information charges are transferred from the channel region 231 under the output-control electrode 233 to the channel region 231 under the output-control electrode 234. In the vertical shift registers 230 on the even-numbered columns, the output-control gate electrode 236 In the off-state. Thus, the information charges are not transferred from the channel region 231 under the output-control gate electrode 233 to the channel region 231 under the output-control gate electrode 234, but are collected in the channel region 231 under the output-control gate electrode 235.

The clock pulse TG3 has the level H at the time TA9, so the output-control gate electrode 237 is turned on, forming a potential well. When the clock pulse TG2 has the level L at the time TA10, the output-control gate electrode 234 is turned off, making the potential well disappear. In this state, the transfer gate electrodes 242 for the vertical shift registers 230 on the odd-numbered columns are in the on-state. The Information charges are transferred from the channel regions 231, under the output-control gate electrodes 234 for the vertical shift registers 230 on the odd-numbered columns, to the channel regions 231 under the transfer gate electrodes 242 of the horizontal shift register 240. Further, in the vertical shift registers 230 on the even-numbered columns, the potential well under the[]output-control transfer gate 234 is free from the information charges. Thus, no information charges are transferred.

At the time TA11, the clock pulse VS2 has the level H, and the clock pulse TG3 has the level L. The transfer gate electrode 232 responsive to the clock pulse VS2 and output-control gate electrode 233 are turned on, forming a potential well. However, the potential well is made to disappear because the output-control gate electrode 237 is turned off.

The clock pulses VS3 and TG1 have the level L at the time TA12. Then, the transfer gate electrode 232 responsive to the clock pulse VS3 and the output-control gate electrode 235 are turned on, thereby forming a potential well. The information charges are transferred from the channel region 231 under the transfer gate electrode 232 responsive to the clock pulse VS3 to the channel region 231 under the transfer gate electrode 232 responsive to the clock pulse VS2. At the same time, in the vertical shift registers 230 on the even-numbered columns, the information charges are transferred from the channel region 231 under the output-control gate electrode 235 to the channel region 231 under the output-control gate electrode 233. At the time TA12, the transfer operation is repeatedly carried out in response to the clock pulses HS1 and HS2. Thus, the information charges in the channel regions 231 under the transfer gate electrode 242 are horizontally transferred inthe transfer gate electrodes 242, along the channel regions 241 of the horizontal shift register 240. The cycles of clock pulses HS1 and HS2 are determined such that a half row of the information charges in the horizontal shift register 240 is transferred within a predetermined period of time. Thus, all the information charges are transferee out of the channel regions 241 in the horizontal shift register 240 before the arrival of succeeding information charges from the vertical shift registers 240.

As shown in FIG. 16, during the times TB0 to TB10, the information charges are transferred from the channels regions 231, in the vertical shift registers 230 on the even-numbered columns, to the channel regions 241 in the horizontal shift register 240.

At the time TB0 when the horizontal transfer operation is completed in the horizontal shift register 240, the clock pulse HS1 is set to the level L and the clock pulse HS2 is set to the level H. Thus, the transfer gate electrodes 242, responsive to the vertical shift registers 230 on the odd-numbered columns, are turned off, making the potential well disappear. The transfer gate electrodes 242, responsive to the vertical shift registers 230 on the even-numbered columns, are turned on, forming a potential well. In the odd-numbered vertical shift registers 230, the information charges have been transferred during the times TA0 to TA12. Therefore, no information charges are present in the channel regions 231 under the output-control gate electrodes 233–237 and the channel regions 231 under the transfer gate electrode 232 adjacent to the output-control gate electrodes 233 and 235.

When the clock pulse VS1 and TG2 have the level H at the time TB1, the transfer gate electrodes 232 and the output-control gate electrodes which are responsive to the clock pulse VS1 are turned on, forming a potential well.

At the time TB2, the clock pulse VS2 has the level L, so the transfer gate electrodes 232 responsive to the clock pulse VS2 and the output-control gate electrode are turned off, making the potential well disappear. Accordingly, the information charges are returned from the channel region 231 under the transfer gate electrode 232 responsive to the clock pulse VS2 to the channel region 231 under the transfer gate electrode 232 responsive to the clock pulse VS1. Simultaneously, in the vertical shift registers 230 of the even-numbered columns, the information charges are transferred from the channel region 231 under the output-control gate electrode 233 to the channel regions 231 under the output-control gates 234 and 236.

The clock pulse VS3 has the level H at the time TB3, and the transfer gate electrode 232 responsive to the clock pulse VS3 is turned on, thereby forming a potential well. At the time TB4, the clock pulse VS1 has the level L. Then, the transfer gate electrodes responsive to the clock pulse VS1 and the output-control gate electrode 236 are turned off, making the potential well disappear. Therefore, the information charges, which have been transferred to the channel regions under the transfer gate electrode 232 responsive to the clock pulses VS1 during the times TB1 and TB2, are returned to the transfer gate electrode 232 responsive to the clock pulse VS1. In this state, the information charges are moved from the channel regions 231 under the output-control gate electrodes 234 and 236 to the channel regions 231 under the output-control gate electrode 234.

At the time TB5, the clock pulse TG3 has the level H, so the output-control gate electrode 237 is turned on, forming a potential well. When the clock pulse TG2 has the level L at the time TB6, the output-control gate electrode 234 is turned off, making the potential well disappear. Thus, the information charges are transferred from the channel region 231 under the output-control gate electrode 234 to the channel region 241 under the transfer gate electrode 242 in the horizontal shift register 240 via the channel region 231 under the output-control gate electrode 237.

When the clock pulse VS1 has the level H and the clock pulse TG3 has the level L at the time TB7, the transfer gate electrode 232 responsive to the clock pulse VS1 is turned on, forming a potential well. Concurrently, the output-control gate electrode 237 is turned off, making the potential well disappear.

The transfer gate 232, which is responsive to the clock pulse VS3 having the level L at the time TB8, is turned on, and forms a potential well. Thus, the information charges are transferred from the channel region 231, under the transfer gate electrode 232 responsive to the clock pulse VS1, to the channel region 231 of the transfer gate electrode 232 responsive to the clock pulse VS3.

At the time TB9, the clock pulse VS2 has the level H, so the transfer gate electrode 232 responsive to the clock pulse VS2 is turned on, forming a potential well. Then, the clock pulse VS1 has the level L at the time TB10, so the transfer gate electrode 232 responsive to the clock pulse VS1 is turned off, making the potential well disappear. Accordingly, the information charges are transferred from the channel region 231 under the transfer gate electrode 232 responsive to the clock pulse VS1 to the channel region 231 of the transfer gate electrode 232 responsive to the clock pulse VS2. In the state at the time TBlO, the clock pulses HS1 and HS2 are repeatedly reversed, so the information charges under the transfer gate electrodes 242 are horizontally transferred from the channel regions 241 in the horizontal shift registers 240.

Each half row of the information charges is transferred from the vertical shift registers 230 to the horizontal shift register 240 through not only the repeated operations of the transfer gate electrodes and the output-control gate electrodes but also the horizontal transfer operation of the horizontal shift register at the times TA0–TA12 and TB0–TB10. According to this method, each row of the information charges in the vertical shift registers on the odd- and even-numbered columns can be separately read.

Therefore, when the solid-state image pickup device of the third embodiment has color filters in which colors on the odd-numbered and even-numbered pixels are different, color components can be easily separated, and the picture signals can be processed in a simplified manner.

Each half line of information charges is sequentially read from the vertical shift registers 230 by the operation of the transfer electrodes at the times TA0–TA12 and TB0–TB12 and the horizontal transfer operation of the horizontal shift register 240.

What is claimed is:

1. A solid-state image pickup device for converting an image into a time-serial electrical signal and outputting the signal, said solid-state image pickup device comprising:

a plurality of pixels including odd-numbered and even-numbered pixel columns, said pixels generating information charges in response to an image;

a plurality of vertical shift registers for vertically transferring the information charges generated by said plurality of pixels, said vertical shift registers including odd-numbered and even-numbered columns which respectively correspond to said odd-numbered and said even-numbered pixel columns;

a horizontal shift register coupled to and shared by both the odd-numbered and even-numbered columns of the plurality of vertical shift registers without any intervening temporary registers for receiving the information charges from said plurality of vertical shift registers and horizontally transferring the information charges; and an output unit for converting the information charges from said horizontal shift register into a voltage value, wherein said plurality of vertical shift registers include
   vertical transfer electrodes extending over said odd-numbered and even-numbered columns of said plurality of vertical shift registers for vertically transferring the information charges in each of said plurality of vertical shift registers and first and second output-control electrodes disposed at an output end thereof partially overlapping each other and the first output-control electrode partially overlapping a last vertical transfer electrode, the first and second output-control electrodes extending over said plurality of vertical shift registers for controlling a transfer time of the information charges from both the odd-numbered and even-numbered columns of the plurality of vertical shift registers by suspending transfer of the information charges to said horizontal shift register independently of vertical transfer of the information charges by the vertical transfer electrodes, such that the information charges are transferred from odd-numbered and even-numbered columns of said plurality of vertical shift registers to the horizontal shift register at different times.

2. The solid-state image pickup device as in claim 1, wherein the horizontal shift register includes horizontal transfer electrodes for controlling the transfer of the information charges respectively received from one of odd-numbered and even-numbered columns in an alternating manner, said horizontal transfer electrodes having odd-numbered bit electrodes corresponding to the odd-numbered columns of the vertical shift registers and even-numbered bit electrodes corresponding to the even-numbered columns of the vertical shift registers, and the odd-numbered bit electrodes and the even-numbered bit electrodes being spatially interleaved with each other.

3. The solid-state image pickup device as in claim 2, wherein each one of the odd-numbered and even-numbered bit electrodes has two corresponding horizontal transfer electrodes.

4. A method of driving the solid-state image pickup device defined in claim 1, wherein odd-numbered bits of said horizontal shift register are connected to odd-numbered columns of said vertical shift registers, even-numbered bits of the horizontal shift register are connected to even-numbered columns of said vertical shift registers, information charges generated by said plurality of pixels are transferred to the horizontal shift register which is shared by both odd-numbered and even-numbered columns of the vertical shift registers, and the horizontal shift register transfers the information charges, said method comprising:

(a) a first step of turning off the even-numbered bits, turning on the odd-numbered bits, and applying a clock pulse to said vertical transfer electrodes and said output-control electrodes so as to transfer information charges from the odd-numbered columns of said vertical shift registers to the odd-numbered bits of the horizontal shift register;

(b) a second step of turning off one of the output-control gate electrodes and horizontally transferring the information charges in the odd-numbered bits of the horizontal shift register;

(c) a third step of turning off the odd-numbered bits, turning on the even-numbered bits, and applying a clock pulse to said vertical transfer electrodes and said output-control electrodes so as to transfer the information charges from the even-numbered columns of said vertical shift registers to the even-numbered bits of said horizontal shift register; and (d) a fourth step of turning off one of the output-control electrodes and horizontally transferring the information charges in the even-numbered bits of the horizontal shift register.

5. The method as in claim 4, wherein the time for transferring the information charges from the even-numbered columns of said vertical shift registers to the horizontal shift register is delayed by half a horizontal scanning period compared with the time in which the information charges are transferred from the odd-numbered columns of said vretical shift registers to the horizontal shift register.

6. A solid-state image pickup device for converting an image into a time-serial electrical signal and outputting the signal, said solid-state image pickup device comprising:

a plurality of pixels, including odd-numbered and even-numbered pixel columns, said pixels generating information charges in response to an image;

a plurality of vertical shift registers for transferring the information charges generated by said plurality of pixels, the vertical shift registers including odd-numbered and even-numbered columns which respectively correspond to said odd-numbered and even-numbered pixel columns;

a horizontal shift register coupled to and shared by both the odd-numbered and even-numbered columns of the plurality of vertical shift registers without any intervening temporary registers for receiving the information charges from said plurality of vertical shift registers and horizontally transferring the information charges; and an output unit for converting the information charges from said horizontal shift register into a voltage value, wherein said plurality of vertical shift registers include vertical transfer electrodes extending over said odd-numbered and even-numbered columns of said plurality of vertical shift registers for vertically transferring the information charges in each of said plurality of vertical shift registers and at least a pair ofl first and second output-control electrodes disposed at an output end thereof partially overlapping each other and the first output-control electrode partially overlapping a last vertical transfer electrode, the first and second output-control electrodes controlling the transfer of the information charges from the odd-numbered and even-numbered columns of the plurality of vertical shift registers, said first and second output-control electrodes span over said plurality of vertical shift registers, and are formed in an alternately undulating manner in the even-numbered and odd-numbered columns of said plurality of vertical shift registers and temporarily reserve the information charges in the odd-numbered and even-numbered columns of said vertical shift registers such that the information charges are alternately transferred from the odd-numbered and even-numbered columns of said plurality of vertical shift registers to the horizontal shift register.

7. The solid-state image pickup device as in claim 6, wherein the horizontal shift register includes horizontal transfer electrodes comprising odd-numbered and even-numbered bit electrodes which are alternately arranged.

8. A method of driving the solid-state image pickup device defined in claim 6 wherein information charges generated by a plurality of pixels arranged in the shape of a matrix are transferred to the horizontal shift register for each column of the vertical shift registers, and the horizontal shift register transfers each row of the information charges, said method comprising the steps of:

(a) alternately operating first and second output-control electrodes so as to displace positions for reserving the information charges by one bit in the vertical shift registers on the odd-numbered and even-numbered columns;

(b) receiving the information charges from the vertical shift registers on the odd-numbered columns at odd-numbered bits of the horizontal shift register and horizontally transferring and outputting from the output unit the received information charges during a first period of time; and (c) receiving the information charges from the vertical shift registers on the even-numbered columns at even-numbered bits of the horizontal shift register in a succeeding second period.

9. The method as in claim 8 further comprising:

(d) a first step of turning on the first and second output-control electrodes so as to store the information charges thereunder;

(e) a second step of turning off one of the output-control gate electrodes and displacing the information charge storing position, of the vertical shift registers on the odd-numbered column, near the horizontal shift register by one bit compared with the information charge storing position of the vertical shift register on the even-numbered column;

(f) a third step of receiving the information charges of the vertical shift registers on the odd-numbered column in the horizontal shift register and horizontally transferring and outputting the information charges from the output unit the received information charges;

(g) a fourth step of again turning on the first and second output-control electrodes;

(h) a fifth step of turning off the output electrode which is not the one turned on in the first step (d) and displacing the information charge storing position, of the vertical shift registers on the even-numbered column, near the horizontal shift register by one bit; and (i) a sixth step of receiving the information charges from the vertical shift registers on the even-numbered columns and horizontally transferring and outputting the information charges from the output unit the received information charges.

10. The method as in claim 8, wherein the time to transfer the information charges from the vertical shift registers on the even-numbered columns to the horizontal shift register is delayed by half a horizontal scanning period compared with the time to transfer the information charges from the vertical shift register on the odd-numbered column to the horizontal shift register.

11. A solid-state image pickup device for converting an image into a time-serial electrical signal and outputting the signal, said solid-state image pickup device comprising:

a plurality of pixels two-dimensionally arranged in a matrix, including odd-numbered and even-numbered pixel columns, the pixels generating information charges in response to an image;

a plurality of vertical shift registers for vertically transferring the information charges generated by said plurality of pixels, said vertical shift registers including odd-numbered and even-numbered columns which respectively correspond to said odd-numbered and even-numbered pixel columns;

a horizontal shift register coupled to and shared by both the odd-numbered and even-numbered columns of the plurality of vertical shift registers without any intervening temporary registers for receiving the information charges from said plurality of vertical shift registers and horizontally transferring the information charges; and an output unit for converting the information charges from said horizontal shift register into a voltage value, wherein said plurality of vertical shift registers have first and second output-control electrodes formed across the plurality of vertical registers partially overlapping each other and the first output-control electrode partially overlapping a last vertical transfer electrode, the first and second output-control electrodes controlling a transfer time of the information charges to the horizontal shift register by alternately selecting one of odd-numbered and even-numbered columns.

12. The solid-state image pickup device as in claim 11, wherein said horizontal shift register includes odd-numbered bit electrode groups and even-numbered bit electrodes which are adjacent to one another, and each odd-numbered bit electrode group and each even-numbered bit electrode group have two horizontal transfer electrodes, respectively.

13. A method of driving the solid-state image pickup device defined in claim 11 wherein information charges generated by the plurality of pixels two dimensionally arranged in the matrix are transferred to the horizontal shift register for each column of the plurality of vertical shift registers, and the horizontal shift register transfers each row of the information charges, said method comprising the steps of:

(a) a first step of transferring the information charges in the plurality of vertical shift registers on the odd-numbered and even-numbered columns to the first and second output-control electrodes row by row;

(b) a second step of reading out the information charges relative to the odd-numbered columns in the information charges transferred to said first and second output-control electrodes, through operation of said first and second output-control electrodes to be provided to said horizontal shift register;

(c) a third step of driving said horizontal shift register and horizontally transferring and outputting the information charges of said odd-numbered columns read out in the second step;

(d) a fourth step of reading out the information charges of the even-numbered columns left in said first and second output-control electrodes, through operation of said first and second output-control electrodes to be provided to said horizontal shift register after the output in the third step is completed; and (e) a fifth step of driving said horizontal shift register and horizontally transferring and outputting the information charges of said even-numbered columns read out in the fourth step.

14. The method as in claim 13, wherein the time to transfer the information charges from the vertical shift registers on the even-numbered column to the horizontal shift register is delayed by half a horizontal scanning period compared with the time to transfer the information charges from the vertical shift register on the odd-numbered column to the horizontal shift register.

15. A solid-state image pickup device for converting an image into a time-serial electrical signal and outputting the signal, said solid-state image pickup device comprising:

a plurality of pixels two-dimensionally arranged in a matrix, including odd-numbered and even-numbered pixel columns, the pixels generating information charges in response to an image:

a plurality of vertical shift registers for vertically transferring the information charges generated by said plurality of pixels, said vertical shift registers including odd-numbered and even-numbered columns which respectively correspond to said odd-numbered and even-numbered pixel columns;

a horizontal shift register coupled to and shared by both the odd-numbered and even-numbered columns of the plurality of vertical shift registers for receiving the information charges from said plurality of vertical shift registers and horizontally transferring the information charges; and an output unit for converting the information charges from said horizontal shift register into a voltage value, wherein said plurality of vertical shift registers have a plurality of output-control electrodes formed across the plurality of vertical registers so as to control a transfer time of the information charges to the horizontal shift register by alternately selecting one of odd-numbered and even-numbered columns, the plurality of vertical transfer electrodes are juxtaposed and span over columns of said plurality of vertical shift registers and further include at least two upper output-control electrodes and at least two lower output-control electrodes, wherein said upper and lower output-control electrodes are formed on a substrate substantially parallel to said vertical transfer electrodes and span over the columns of said plurality of vertical shift registers, said upper output-control electrodes cover the substrate in spaces between said vertical transfer electrode and said lower output-control electrode which are adjacent to each other, and in spaces between said lower output-control electrodes in said plurality of vertical shift registers on the even-numbered columns, and spread over any of the lower output-control electrodes without projecting into spaces between said lower output-control electrodes in said plurality of vertical shift registers on the odd-numbered columns.

16. A method of driving the solid-state image pickup device defined in claim 15 wherein information charges generated by the plurality of pixels two dimensionally arranged in the matrix are transferred to the horizontal shift register for each column of the plurality of vertical shift registers, and the horizontal shift register transfers each row of the information charges, said method comprising the steps of:

(a) a first step of transferring the information charges in the plurality of vertical shift registers on the odd-numbered and even-numbered columns to the output-control electrode row by row;

(b) a second step of reading out the information charges relative to the odd-numbered columns in the information charges transferred to said output-control electrodes, through operation of said output-control electrodes to be provided to said horizontal shift register;

(c) a third step of driving said horizontal shift register and horizontally transferring and outputting the information charges of said odd-numbered columns read out in the second step;

(d) a fourth step of reading out the information charges of the even-numbered columns left in said output-control electrodes, through operation of said output-control electrodes to be provided to said horizontal shift register after the output in the third step is completed; and (e) a fifth step of driving said horizontal shift register and horizontally transferring and outputting the information charges of said even-numbered columns read out in the fourth step.

17. The solid-state image pickup device as in claim 15, wherein said horizontal shift register includes odd-numbered bit electrode groups and even-numbered bit electrodes which are adjacent to one another, and each odd-numbered bit electrode group and each even-numbered bit electrode group have two horizontal transfer electrodes, respectively.

18. The method as in claim 17, wherein the time to transfer the information charges from the vertical shift registers on the even-numbered column to the horizontal shift register is delayed by half a horizontal scanning period compared with the time to transfer the information charges from the vertical shift register on the odd-numbered column to the horizontal shift register.

* * * * *